US008780103B2

(12) United States Patent
van Veenendaal et al.

(10) Patent No.: US 8,780,103 B2
(45) Date of Patent: Jul. 15, 2014

(54) SUPER LOW VOLTAGE DRIVING OF DISPLAYS

(75) Inventors: Erik van Veenendaal, Eindhoven (NL); Hjalmar Edzer Ayco Huitema, Eindhoven (NL)

(73) Assignee: Creator Technology B.V., Breda (NL)

( * ) Notice: Subject to any disclaimer, the term of this patent is extended or adjusted under 35 U.S.C. 154(b) by 367 days.

(21) Appl. No.: 13/009,616

(22) Filed: Jan. 19, 2011

(65) Prior Publication Data

US 2012/0182282 A1 Jul. 19, 2012

(51) Int. Cl.
*G06F 3/038* (2013.01)
*G09G 3/34* (2006.01)
*G09G 3/32* (2006.01)

(52) U.S. Cl.
CPC ........ *G09G 3/344* (2013.01); *G09G 2320/0257* (2013.01); *G09G 2310/0254* (2013.01); *G09G 2320/0219* (2013.01); *G09G 2320/0214* (2013.01); *G09G 2310/0235* (2013.01); *G09G 2330/021* (2013.01); *G09G 2300/0876* (2013.01); *G09G 2310/0251* (2013.01); *G09G 3/3225* (2013.01)
USPC ........ 345/212

(58) Field of Classification Search
CPC ........ G09G 2320/0257; G09G 2330/021; G09G 3/3225; G09G 3/344; G09G 2300/0876; G09G 2310/0235; G09G 2310/0251; G09G 10/0254; G09G 2320/0214; G09G 2320/0219
USPC ........ 345/205, 208–212
See application file for complete search history.

(56) References Cited

U.S. PATENT DOCUMENTS

2007/0182704 A1 8/2007 Hiramatsu
2008/0291187 A1* 11/2008 Nose et al. .......... 345/205
2010/0259524 A1* 10/2010 Markvoort et al. .......... 345/211

FOREIGN PATENT DOCUMENTS

EP 1 788 551 A2 11/2006
WO WO 2008/054209 A2 5/2008
WO WO 2008/054210 A2 5/2008

* cited by examiner

*Primary Examiner* — Quan-Zhen Wang
*Assistant Examiner* — Tony Davis

(57) ABSTRACT

A display device is described with a plurality of pixels, each having a pixel state that is driven by a driving voltage differential between a pixel voltage applied to a pixel terminal of the pixel and a common voltage applied to a common terminal of the pixel. In a first pixel driving state, wherein pixels are driven to a first color, a common voltage is provided to the common terminals with a first polarity. In a second pixel driving state, wherein pixels are driven to a second color, a common voltage is provided to the common terminals with a second polarity opposite to the first polarity. An absolute value of the common voltage in the first and second pixel driving state is higher than a maximum absolute value of the column voltage in the corresponding pixel driving state.

15 Claims, 18 Drawing Sheets

SUPER LOW VOLTAGE DRIVING OF DISPLAYS

FIELD AND BACKGROUND OF THE INVENTION

The present invention relates to display devices, such as devices driving an active matrix electrophoretic display by varying the common voltage.

Displays, such as liquid crystal (LC) and electrophoretic displays include particles suspended in a medium sandwiched between a drive or pixel terminal and a common terminal. The pixel terminal can be controlled in various ways. The most simple and low cost way is direct control of the pixel electrode by a display controller. This is called a direct-drive or segmented display, where every pixel (also called a segment in this type of display) is under the direct control of the controller. Another way to control the pixel terminal is by way of passive-matrix driving, where the pixel terminals are connected to each other in rows and the common terminals are connected to each other in columns, where each row and column are under the direct control of a display controller. This way a simple matrix display is formed. This is commonly used for simple LC matrix displays. For electrophoretic media this way of driving does not work, as a requirement for passive matrix driving is a voltage threshold around 0V where the medium does not switch. This is absent in electrophoretic media. The common way to drive larger, higher resolution displays is by means of active-matrix addressing. In that case the pixel terminal includes pixel drivers, such as an array of thin film transistors (TFTs) that are controlled to switch on and off to form an image on the display. This conventional method of driving a display is referred to as scan line driving. The voltage difference between a TFT or the pixel terminal and the common terminal, which is on the viewer's side of the display, causes migration of the suspended particles, thus forming the image. Displays with an array of individually controlled TFTs or pixels are referred to as active-matrix displays.

In order to change image content on an electrophoretic display, such as from E Ink Corporation for example, new image information is written for a certain amount of time, such as 500 ms to 1000 ms. As the refresh rate of the active-matrix is usually higher, this results in addressing the same image content during a number of frames, such as at a frame rate of 50 Hz, 25 to 50 frames. Electrophoretic active matrix displays are applied in many applications such as e-readers. Although this text refers generally to E Ink as examples of electrophoretic displays, it is understood that the invention can be applied to electrophoretic displays in general, such as e.g. SiPix, where the microcups are filled with white particles in a black fluid.

Circuitry to drive displays, such as electrophoretic displays, are well known, such as described in U.S. Pat. No. 5,617,111 to Saitoh, International Publication No. WO 2005/034075 to Johnson, International Publication No. WO 2005/055187 to Shikina, U.S. Pat. No. 6,906,851 to Yuasa, and U.S. Patent Application Publication No. 2005/0179852 to Kawai; U.S. Patent Application Publication No. 2005/0231461 to Raap; U.S. Pat. No. 4,814,760 to Johnston; International Publication No. WO 01/02899 to Albert; Japanese Patent Application Publication Number 2004-094168 and WO2008/054209 and WO2008/054210 to Markvoort, each of which is incorporated herein by reference in its entirety.

Conventional active matrix E-ink displays suffer from various drawbacks. One drawback is that power consumption during an image update is relatively large, due to the relatively high voltages that must be applied during addressing of the display. A straightforward solution would be lowering the addressing voltages. However, the disadvantage of the lower voltage levels is that the image update time increases more than linear with the voltage reduction, leading to very long image update times (i.e., slower image updates). Another drawback is that the image update time of E-ink is relatively long despite the high voltage levels.

WO 2008/054209 referred to herein above discloses a display without an increased image update time, wherein the voltages on the active matrix and thereby the power consumption are decreased. The drive scheme uses a voltage not equal to zero on the common electrode of the display to reduce the voltages needed in the rows and columns of the active matrix. During a first period, wherein the pixels may be brought in an extreme pixel state corresponding to a first color (e.g. white or black), the voltage on the common electrode has a first polarity. The pixels now can be brought in the first color state by providing a column voltage with an opposite second polarity. The pixels that should not be brought in the first color state are provided with a column voltage having the same polarity and value as the voltage on the common electrode. As a result, there is a "stable transition", wherein there is no voltage over the pixel and the color of the pixels concerned does not change. Thereby, image artifacts can be avoided. During a second period, wherein the pixels may be brought in an extreme pixel state corresponding to a second color (black if the first color is white and white if the first color is black), the voltage on the common electrode has the second opposite polarity. The pixels now can be brought in the second color state by providing a column voltage with the opposite first polarity. The pixels that should not be brought in the second color state are provided with a column voltage having the same polarity and value as the voltage on the common electrode, resulting in a stable transition without color change for those pixels.

Although the power consumption of the display known from WO2008/054209 is reduced with respect to other prior art display devices, it is desirable to reduce it even further, in particular to conserve battery life of mobile products.

SUMMARY OF THE INVENTION

According to a first aspect of the invention there is provided a display device comprising a plurality of switches, each of the switches comprising an operational terminal and controlling the voltage on said operational terminal. There are a plurality of pixels each having a pixel state that is driven by a driving voltage differential between a pixel voltage applied to a pixel terminal of the pixel and a common voltage applied to a common terminal of the pixel. Said pixel terminal is coupled to a corresponding operational terminal of the switch. The display device comprises furthermore a common driver for providing a variable common voltage to the common terminals.

A controller controls the common driver in a first pixel driving state, wherein pixels are driven to a first color, to provide a common voltage to the common terminals with a first polarity and controls the common driver in a second pixel driving state, wherein pixels are driven to a second color, to provide a common voltage to the common terminals with a second polarity opposite to the first polarity. It also controls the operation of the switches for driving said plurality of pixels. A swing on the common voltage, i.e. an absolute value of the difference between the common voltage in the first pixel driving state and the common voltage in the second driving state is larger than a swing on the pixel voltage, i.e. an absolute value of the difference between a maximum pixel voltage and a minimum pixel voltage. It should be noted that the maximum and minimum pixel voltage in the framework of this invention are the maximum and minimum voltages that may be reached during the charging of the pixel. At the times that the pixel is not charged, the pixel voltage may be larger or smaller due to capacitive coupling to other electrodes.

In case of using the electrophoretic medium supplied by E Ink, the first color is white and the first polarity is positive and the second color is black and the second polarity is negative. However, the electrophoretic medium supplied by SiPix reacts opposite to the electric field, so in that case the relations between the colors and the polarities are also opposite.

The ‘super low voltage’ drive state thus obtained can be applied to segmented (i.e. direct drive) displays using an electrophoretic medium. Here, the switches for controlling the voltage may be located in the controller itself. The switches maybe comprised of an output of a multi-level shift register, the output of an amplifier or a combination thereof, located in the controller. In the case of direct drive displays, the advantage is that the voltage that needs to be supplied by the driver can be reduced, thereby reducing the cost of the driver. Also the power consumption can be lowered, as the voltage swing on the electrode that needs to be switched the most can be reduced. Alternatively the switching speed can be increased with the same voltage swing on the multi-level driver.

According to an embodiment, the display is driven by active-matrix addressing. In that case, the switches are semiconductor switching devices such as transistors and the display device comprises a column driver and a row driver.

Each semiconductor switching device comprises a first operational terminal, which in case that semiconductor switching device is a TFT transistor is a source terminal thereof, a switching control terminal, which in case that semiconductor switching device is a TFT transistor is a gate terminal thereof, and second operational terminal, which in case that semiconductor switching device is a TFT transistor is a drain terminal thereof. The column driver is connected to the first operational terminals for providing column voltages. The row driver is connected to the switching control terminals for providing a row select voltage switching the semiconductor switching devices of a row to a conductive state and a row non-select voltage switching the semiconductor switching devices of a row to a non-conductive state.

The pixel terminal is connected to a second operational terminal of a corresponding semiconductor switching device and the pixel voltage is applied to the pixel terminal by providing a column voltage to the first operational terminal of a corresponding semiconductor switching device being in the conductive state.

The controller controls the operation of the column driver, row driver, and common driver for driving said plurality of pixels. The swing on the common voltage is larger than a swing on the column voltage, i.e. an absolute value of the difference between a maximum column voltage and a minimum column voltage, which can be provided by the column driver.

With active matrix addressing, the ‘super low voltage’ drive state has as effect, that the voltages applied to the active matrix (i.e. to the first operational terminals and the switching control terminals of the semiconductor switching devices) may be reduced compared to prior art arrangements. This leads to a reduction of the power consumption required for an image update, as that is proportional to the voltages squared and also reduces the cost of the drivers. Alternatively, during the super low voltage drive on the active matrix equal voltages may be applied with respect to prior art arrangements. This has the effect that the driving voltage standing over the pixels is increased and accordingly, that the image update time is decreased. This results in an increase in the operational lifetime and reduction of the power consumption as the display will be driven a smaller fraction of the time.

According to a further embodiment, a swing on the row voltage, i.e. an absolute value of the difference between the row select voltage and the row non-select voltage is larger than a swing on the column voltage, i.e. an absolute value of the difference between a maximum column voltage and a minimum column voltage, which can be provided by the column driver during the first and the second driving state, in such a way that the semiconducting switching devices can be switched in their conducting state and in their non-conducting state irrespective of column and pixel voltage levels. This is to ensure proper charging of the pixels when the semiconductor switching devices of a corresponding row are in the conductive state and proper retention of charge on the pixels when the semiconductor switching devices are in the non-conductive state.

The display device may additionally comprise a storage driver for providing a storage voltage to a storage capacitor, connected between the storage driver and the pixel terminal of the pixel, having a storage voltage swing being proportional to a common voltage swing. The storage driver may be controlled, by the controller to change the voltage of the storage capacitor with proportional amplitude to and at substantially the same time as the common voltage. By varying the common voltage and the storage voltage of the storage capacitor at substantially the same time and by an amount substantially related to the ratio of the storage capacitance and the total pixel capacitance, the voltage across the pixels does not change, when the common voltage is switched. Consequently, the display effect or image formed by the pixel is maintained with minimal disturbance, yet various advantages may be achieved such as faster image update speed or reduced image update time, reduced column and/or row voltage levels, reduced power consumption, as well as improved image uniformity.

According to a further embodiment, the common driver and storage driver are controlled, by the controller during a start up phase for an image update before the first or second pixel driving state, in a first step to change a value of the common voltage and the storage voltage so that due to the change a value of the pixel voltage is changed to a value that keeps the corresponding semiconductor switching device in its non-conducting state. The column driver is controlled, by the controller in at least one reset step to reset the value of the pixel voltage. The common driver and the storage driver are controlled, by the controller in a second step to increase the value of the common voltage and the storage voltage to the value corresponding to the first or second driving state, which ever is applicable. If the value of the common voltage and storage voltage were changed to the value corresponding to the first or second driving state in one go, depending on the driving state in which the display device is in, the pixel voltage would be changed to a value that either causes the corresponding semiconductor switching device to switch to its conducting state causing image artefacts due to undesired leakage of the semiconductor switching devices or would reach values that could potentially damage the circuitry. By means of the change of the common voltage and the storage voltage in two (or more) steps with a reset of the pixel voltage value in between, such undesirable values of the pixel voltage are avoided.

According to a still further embodiment, the common driver and the storage driver are controlled, by the controller during a transition phase from the first to the second pixel driving state or vice verse, to change the value of the common voltage and storage voltage in a number of steps from the value corresponding to the first pixel driving state to the second pixel driving state or vice versa. Each of the stepwise value changes of the common voltage and storage voltage results in a value change of the pixel voltage. The column driver is controlled, by the controller in at least a reset step between the steps to change the column voltage in such a way that the value of the pixel voltage is changed in a direction opposite to the direction of the value change of the pixel voltage caused by the value change of the common voltage and storage voltage. If the value of the common voltage and storage voltage were changed from the value corresponding to the first or second driving state to the value corresponding to the other one of these two states in one go, this would cause pixel voltages potentially damaging to the circuitry and/or cause image artefacts due to undesired leakage of the pixel voltage induced by the pixel voltage causing the corresponding semiconductor switching device to switch to its conducting state. By means of changing the common voltage and storage voltage in two (or more) steps from the value of the first super low voltage driving state to the value corresponding to the second low voltage state with a reset of the pixel voltage to a lower absolute value in between, such undesirable values of the pixel voltage are avoided.

According to a yet further embodiment, potentially damaging or image artifacts causing pixel voltages are avoided during a shutdown phase at the end of an image update after the first or second pixel driving state. Thereto, the common driver and storage driver are controlled, by the controller during the shutdown phase to change the value of the common voltage and storage voltage in a number of steps to their final values, each of the stepwise value changes of the common voltage and storage voltage resulting in a value change of the pixel voltage. The column driver is controlled, by the controller in at least a reset step between the steps to change the column voltage in such a way that the value of the pixel voltage is changed in a direction opposite to the direction of the value change of the pixel voltage caused by the value change of the common voltage and the storage voltage.

With the super low voltage driving scheme according to the invention, it becomes impossible to apply a zero-voltage over the pixels during the super low voltage driving states. So, the stable transition, wherein the color of a pixel is kept stable, is no longer available. In some situations special care has to be taken to avoid artifacts because of this.

A first one is the situation, wherein pixels are already completely driven in the direction accessible during a certain state, i.e. pixels are already completely in a state corresponding to a certain color, when starting a super low voltage drive state, wherein the pixels are driven to that color state. The reason is that in super low voltage drive all pixels will be switching, as there is no zero voltage state over the pixels available anymore. Driving a pixel in the extreme switching state further in the same direction, which is called overdriving, can cause image artifacts later on, due to image sticking.

To avoid or reduce such overdriving, the common driver and storage driver are controlled, by the controller during the start up phase, in a third step to provide a common voltage and storage voltage enabling the provision of a zero voltage over the pixels and providing a common voltage with a polarity opposite to the polarity of the common voltage during the remainder of the start-up phase.

At the end of an image update a similar but reversed problem occurs if no countermeasures are taken. Some of the pixels that have to be in the extreme switching state, either corresponding to the first color or the second color at the end of the image update will be driven from their extreme position by the last super low voltage drive state, if this drive state is in the opposite direction. For example, pixels that need to be completely in the first color state will not keep their switching state when the last super low voltage drive state is a state for driving pixels to the second color, because in super low voltage drive all pixels will switch in the same direction during a state.

To avoid or reduce this undesired effect, according to a further embodiment of the invention, the common driver and storage driver are controlled, by the controller in a further step during the shutdown phase at the end of an image update to provide a common voltage with a polarity opposite to the polarity of the common voltage during the remainder of the shutdown phase, where during this further step the provision of zero voltage over the pixels is enabled. During this further step, the extreme switching states are restored of the pixels that were driven in the wrong direction during the previous super low voltage state.

In a second aspect there is provided a method for driving a display according to the first aspect.

Further areas of applicability of the present systems and methods will become apparent from the detailed description provided hereinafter. It should be understood that the detailed description and specific examples, while indicating exemplary embodiments of the displays and methods, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawing where in:

DETAILED DESCRIPTION

The following description of certain exemplary embodiments is merely exemplary in nature and is in no way intended to limit the invention, its application, or uses. In the following detailed description of embodiments of the present systems, devices and methods, reference is made to the accompanying drawings which form a part hereof, and in which are shown by way of illustration specific embodiments in which the described devices and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Figure 1:
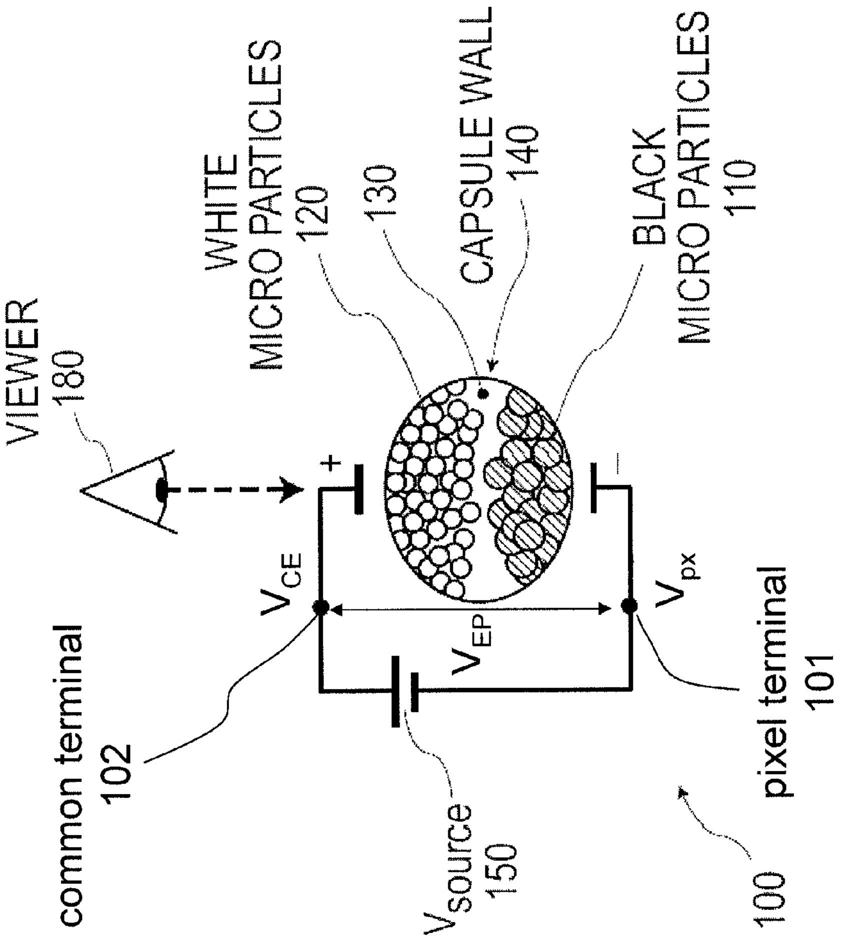
FIG. 1 shows a conventional E-ink display device.

FIG. 1 shows a schematic representation 100 of the E-ink principle, where different color particles, such as black micro-particles 110 and white micro-particles 120 suspended in a medium 130, are encapsulated by the wall of an E-ink capsule 140. Typically, the E-ink capsule 140 has a diameter of approximately 40 microns. A voltage source 150 is connected across a pixel electrode 101 and a common electrode 102 located on the side of the display viewed by a viewer 180. The voltage on the pixel terminal 101 is referred to as the pixel voltage $V_{px}$, while the voltage on the common terminal 102 is referred to as the common electrode voltage $V_{CE}$. The voltage across the pixel or capsule 140, i.e., the difference between the common electrode and pixel voltages, is shown in FIG. 5 as $V_{EP}$.

In the presence of an electric field the pigments in the microcapsules move in and out of the field of view; when the electric field is removed the pigments stop moving and the current grey scale is preserved; this effect is known in the art as 'bi-stable'. In this text it is assumed for conciseness that the pixels comprise positively charged black micro-particles and negatively charged white micro-particles. It is understood that any other set of first and second colors could be given to the micro-particles without affecting the working principle. Where there is written that a pixel is in a black state or in a white state, it is understood that micro-particles with a first or second color, respectively, are dominantly present on a viewing side of the pixel. Similarly where there is written that a pixel is in a grey state it is understood that a mix of any particular proportions of the first and second colored micro-particles is present on the viewing side of the pixel.

The relative sizes of the voltages applied at the pixel and common terminals determine the magnitude and the direction of the electric fields through the pixels and therewith the speed and direction of the drifting microparticles. The polarity and absolute magnitude of the voltages that are shown in the figures and text thus mainly serve an exemplary role for particular embodiments of the invention and should not be construed as limiting to its scope, Sometimes the exemplary relative absolute magnitudes of voltages for different driving modes are important because e.g. higher voltage differentials allow for faster pixel switching speeds, but may also lead to shorter lifetime of the electronic components.

Figure 3:
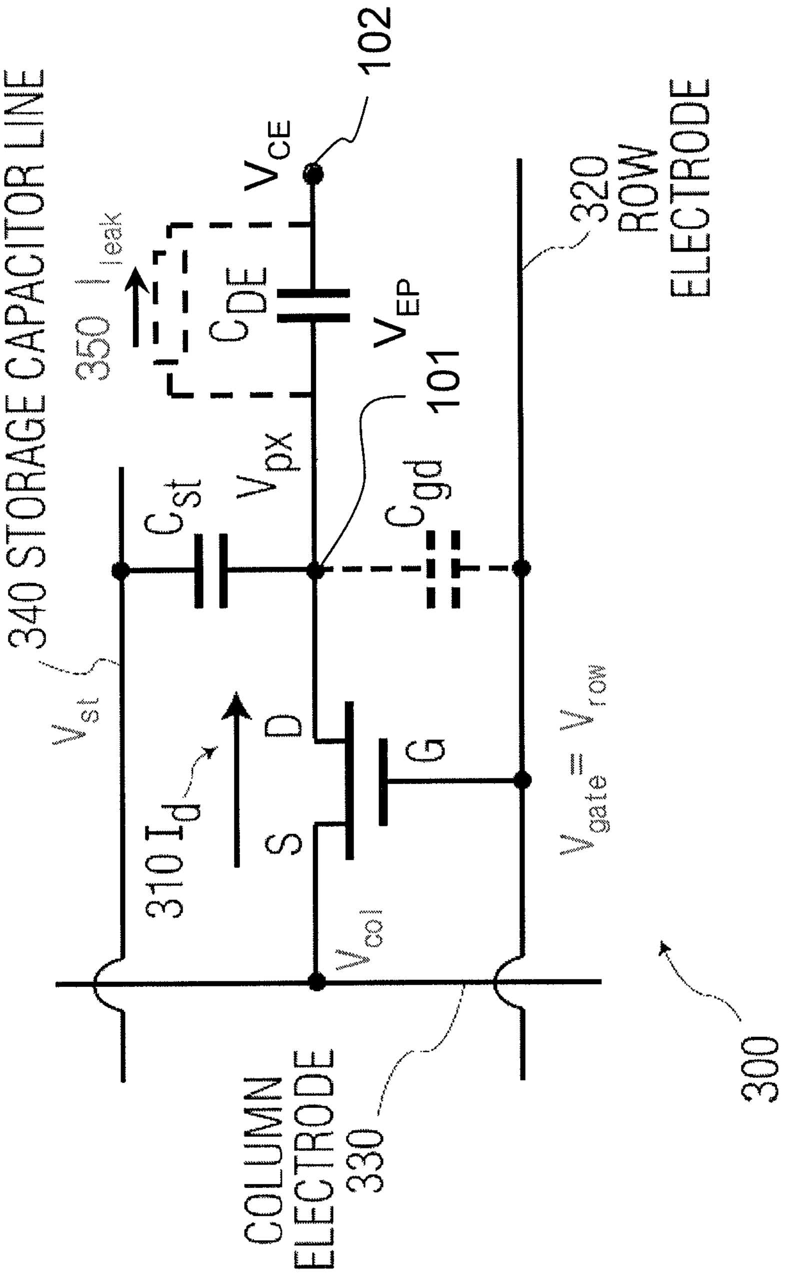
FIG. 3 shows the equivalent circuit of a pixel in a conventional active-matrix display.
Figure 5:
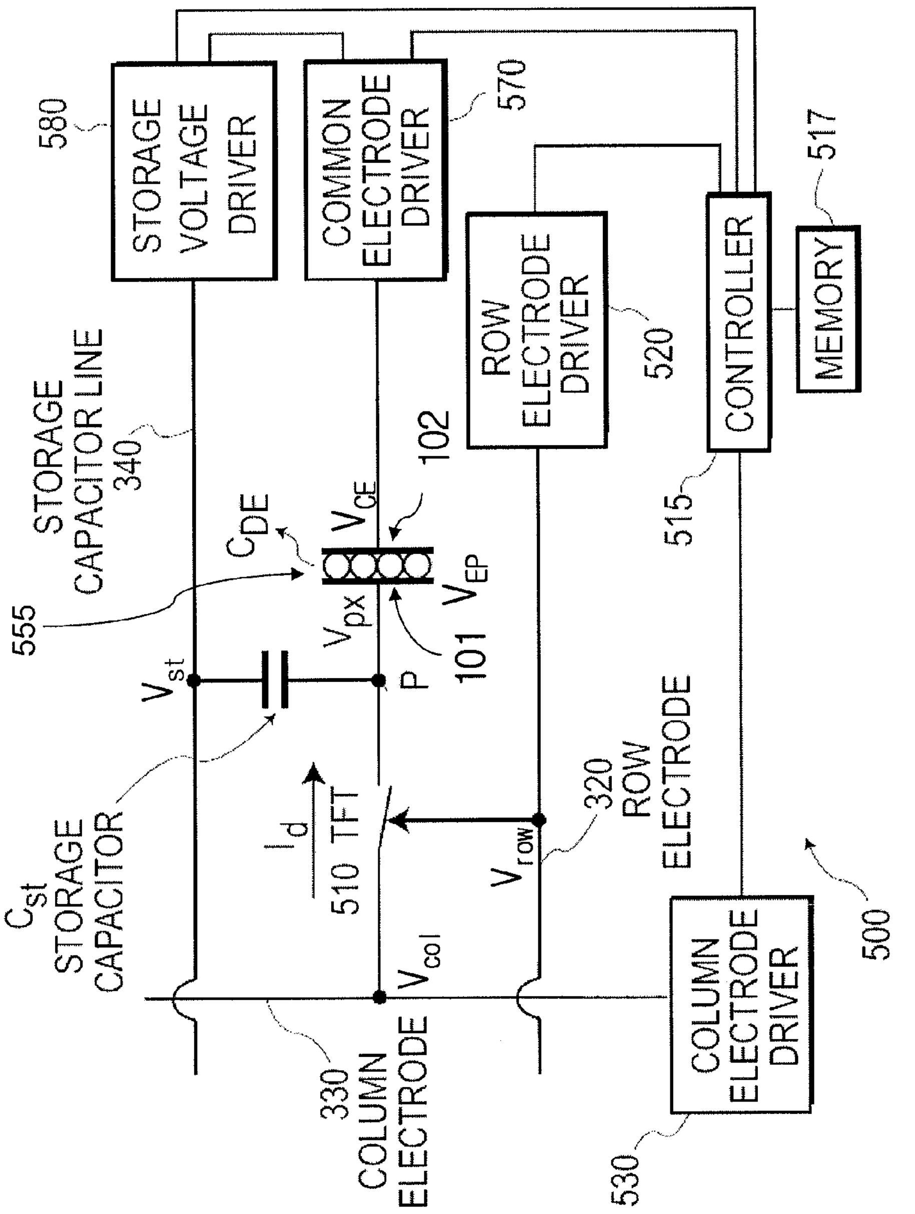
FIG. 5 shows a simplified circuit for the active matrix pixel circuit.

Addressing of the E-ink 140 from black to white, for example, requires a pixel represented as a display effect or pixel capacitor $C_{DE}$ in FIGS. 3 and 5 and connected between pixel electrodes 101 and a common electrode 102, to be charged to −15V during 200 ms to 400 ms. That is, if the common voltage $V_{CE}$=0V the pixel voltage $V_{px}$ at the pixel electrode 101 (also shown in FIG. 5 as the voltage at node P) is charged to −15V, then $V_{EP}=V_{CE}-V_{px}=0-(-15)=+15$V. During this time, the white particles 120 drift towards the top common electrode 102, while the black particles 110 drift towards the bottom (active-matrix, e.g., TFT, back plane) pixel electrode 101, also referred to as the pixel pad.

Switching to a black screen, where the black particles 110 move towards the common electrode 102, requires a positive pixel voltage $V_{px}$ at the pixel electrode 101 with respect to the common electrode voltage $V_{CE}$. In the case where $V_{CE}$=0V and $V_{px}$=+15V, the voltage across the pixel ($C_{DE}$ in FIG. 5) is $V_{EP}=V_{CE}-V_{px}=0-(+15)=-15$V. When the voltage across the pixel $V_{EP}$ is 0V, such as when both the pixel voltage $V_{px}$ at the pixel electrode 101 and the common electrode voltage $V_{CE}$ are 0V ($V_{px}=V_{CE}=0$), then the E-ink particles 110, 120 do not switch or move.

This way of pixel driving, wherein $V_{CE}$=0V and wherein the absolute value of the column voltage is relatively high will be referred to as High Voltage Driving (HVD) in this description. High voltage driving (HVD) allows driving of pixels to White and to Black simultaneously. During a full frame either +15V (to Black) or −15V (to White) is written on a pixel which requires a voltage swing of 30V on the columns.

Figure 2A:
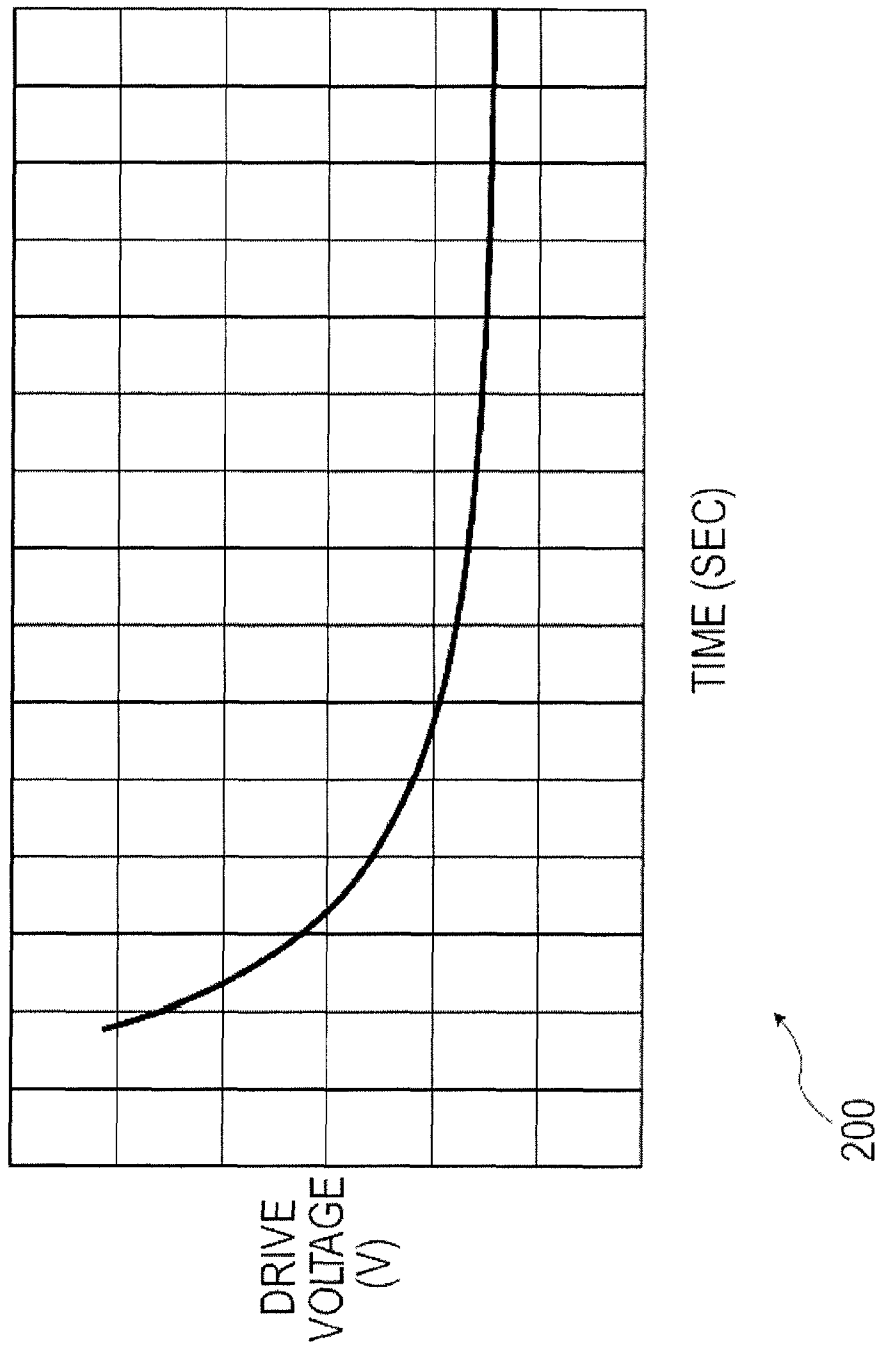
FIG. 2A shows the switching speed of E-ink as a function of the addressing voltage.

FIG. 2A shows a graph 200 of the switching time of the E-ink to switch between the black and white states. The switching time decreases (i.e., the switching speed increases or is faster) with increasing driving voltage differential $V_{EP}$. The graph 200, which shows the driving voltage differential $V_{EP}$ on the y-axis in volts versus time in seconds, applies similarly to both switching from 95% black to 95% white screen state, and vice versa. It should be noted that the switching time decreases by more than a factor two when the drive voltage is doubled. The switching speed therefore increases super-linearly with the applied drive voltage The typical driving voltage differentials $V_{EP}$ across the pixel capacitor $C_{DE}$ shown in FIG. 5 are +15V, 0V and −15V. For such voltage levels, the optical switching characteristic of percent reflection versus time is shown in curve 201 of FIG. 2B, where the switching time is approximately 0.25 seconds. This reflection is caused by white micro particles that are present on the viewing side of the pixel, while the black micro particles are absorbing.

Figure 2B:
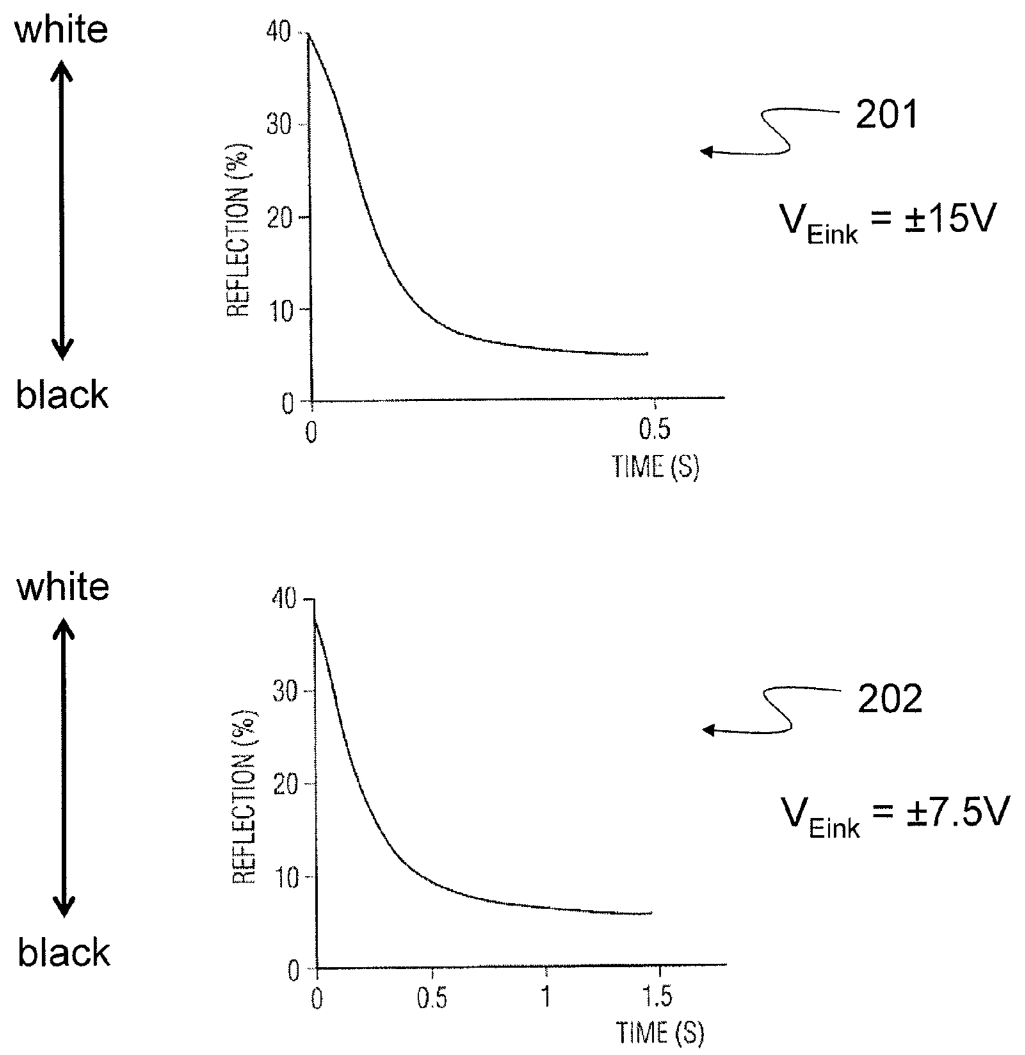
FIG. 2B shows a switching of a pixel for different driving voltages.

If the voltages are reduced from 15V to 7.5V, then switching time is increased to approximately 0.65 seconds, as shown by the curve 202 of FIG. 2B. It should be noted that both curves 201, 202 shown in FIG. 2B have the same behavior or shape; the difference between the two curves 201, 202 is the transition speed, namely, approximately 0.25 seconds for the curve 201 associated with the higher voltage levels of $V_{EP}$=±15V, and approximately 0.65 seconds for the curve 202 associated with the lower voltage levels of $V_{EP}$=±7.5V.

Figure 4:
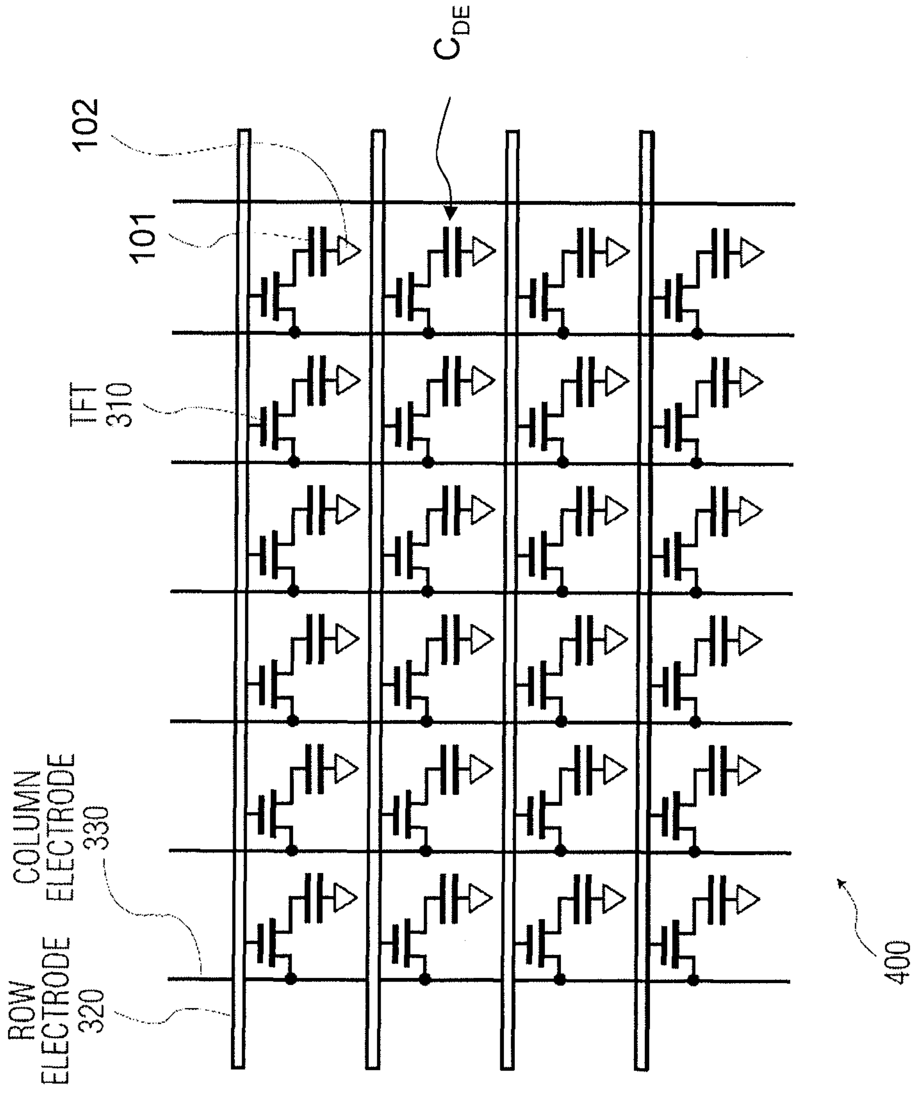
FIG. 4 shows an array of cells of an active-matrix display.

FIG. 3 shows the equivalent circuit 300 for driving a pixel (e.g., capsule 140 in FIG. 1) in an active-matrix display that includes a matrix or array 400 of cells that include one switch, here a semiconductor switching device, such as a transistor 310 per cell or pixel (e.g., pixel capacitor $C_{DE}$) as shown in FIG. 4. In this description the term (matrix) backplane will be used to identify the part of the active-matrix display where the pixel switches and the electrodes to drive the display are located, excluding the common electrode. This is the part that is built with high resolution features using photolithography tracks in an extremely clean environment. The term (matrix) frontplane will be used to identify the switching medium of the display including the top substrate and the common electrode. This part does typically not have the fine features of the backplane and is built on top of the backplane without photolithography.

A row of pixels is selected by applying the appropriate select voltage to the select line or row electrode 320 connecting the switching control terminals, which in this example are the TFT gates, for that row of pixels. When a row of pixels is selected, a desired voltage may be applied to each pixel via its data line or the column electrode 330. When a pixel is selected, it is desired to apply a given voltage to that pixel alone and not to any non-selected pixels. The non-selected pixels should be sufficiently isolated from the voltages circulating through the array for the selected pixels. External controller(s) and drive circuitry is also connected to the cell matrix 400. The external circuits may be connected to the cell matrix 400 by flex-printed circuit board connections, elastomeric interconnects, tape-automated bonding, chip-on-glass, chip-on-plastic and other suitable technologies. Of course, the controllers and drive circuitry may also be integrated with the active matrix itself.

In FIG. 4, the common electrodes 102 are connected to ground instead of a voltage source that provide $V_{CE}$. The transistors 310 may be TFTs, for example, which may be MOSFET transistors 310, as shown in FIG. 3, and are controlled to turn ON/OFF (i.e., switch between a conductive state, where current $I_d$ flows between the source S and drain D, and non-conductive state) by voltage levels applied to row electrodes 320 connected to their gates G, referred to as $V_{row}$ or $V_{gate}$. The sources S of the TFTs 310 are connected to column electrodes 330 where data or image voltage levels, also referred to as the column voltage $V_{col}$ are applied.

As shown in FIG. 3, various capacitors are connected to the drain of the TFT 310, namely, the display effect capacitor $C_{DE}$ that contains the display effect also referred to as the pixel capacitor, and a gate-drain parasitic capacitor $C_{gd}$ between the TFT gate G and drain D shown in dashed lines in FIG. 3. In order to hold the charge or maintain the level of pixel voltage $V_{px}$ (at node P to remain close to the level of the column voltage $V_{col}$) between two select or TFT-ON states, a storage capacitor $C_{st}$ may be provided between the TFT drain D and a storage capacitor line 340. Instead of the separate storage capacitor line 340, it is also possible to use the next or the previous row electrode as the storage capacitor line.

Active-matrix displays are driven one row-at-a-time. During one frame time, all the rows are sequentially selected by applying a voltage that turns on the TFTs, i.e., changing the TFTs from the non-conducting to the conducting state. Pixels to be driven to a certain state are then selected and the corresponding column voltage is provided to the source of the TFT and thereby to the pixel. Pixels that are in a state, which should not be changed, are (in case that $V_{CE}$=0V) provided with a 0V column voltage at their source. This matrix driving principle is well known to a person of average skill in the art and it is therefore not needed to describe it in more detail here, as such.

The conventional active matrix E-ink displays with High Voltage Driving, although it enables the simultaneous driving of pixels to the white state and the black state, suffer from various drawbacks. One drawback is that power consumption during an image update is relatively large, due to the relatively high voltages that must be applied during addressing of the display. A straightforward solution would be lowering the addressing voltages. However, the disadvantage of the lower voltage levels is that the image update time increases more than linear with the voltage reduction as shown in FIG. 2B, leading to very long image update times (i.e., slower image updates). Another drawback is that the image update time of E-ink is relatively long despite the high voltage levels. Accordingly, there is a need for better displays, such as displays with decreased image update time without an increase in the addressing voltage and thus without an increase of power consumption.

An improved scheme for driving the active matrix display is disclosed in the patent application WO 2008/054209 to Markvoort, which is incorporated herein by reference in its entirety. This matrix driving scheme is referred to as the Low Voltage Driving (LVD) scheme. As will be explained in more detail herein after, the common voltage $V_{CE}$ on the common voltage electrode 170 is switched to a positive value during a first time period enabling the driving of pixels to a first color and the common voltage electrode 170 is switched to a positive value during a second time period enabling the driving of pixels to a second color. The voltages on the common electrodes and the row electrodes may be lower than for the High Voltage Driving (HVD) scheme.

FIG. 5 shows a simplified circuit 500 similar to the active matrix pixel circuit 300 shown in FIG. 3, where the TFT 310 is represented by a switch 510 controlled by a signal from the row electrode 320, and the pixel or E-ink is represented by a pixel capacitor $C_{DE}$ connected between one end of the TFT switch 510 and the common electrode 102. The other end of the TFT switch 510 is connected to the column electrode 330.

The TFT 310 or switch 510 closes or conducts when a voltage, e.g., negative voltage, from the row electrode is applied to the TFT gate G resulting in the flow of current $I_d$ through the TFT 310 (or switch 510) between its source S and drain D. As current $I_d$ flows through the TFT, the storage capacitor $C_{st}$ is charged or discharged until the potential of pixel node P at the TFT drain D equals the potential of the column electrode, which is connected to the TFT source S. If the row electrode potential is changed, e.g., to a positive voltage, then the TFT 310 or switch 510 will close or become non-conductive, and the charge or voltage at the pixel node P will be maintained and held by the storage capacitor $C_{st}$. That is, the potential at the pixel node P, referred to as the pixel voltage $V_{px}$ at the TFT drain D will be substantially constant at this moment as there is no current flowing through the TFT 310 or switch 510 in the open or non-conductive state.

The amount of charge on the storage capacitor $C_{st}$ provides or maintains a certain potential or voltage difference between the storage capacitor line 340 and pixel node P of the pixel capacitor $C_{DE}$. If the potential of the storage capacitor line 340 is increased by 5V, then the potential at the pixel node P will also increase by approximately 5V, assuming $\Delta V_{px} \approx \Delta V_{st}$ as will be described. This is because the amount of charge at both nodes of the storage capacitor $C_{st}$ is the same since the charges cannot go anywhere.

It should be understood that for simplicity, it is assumed that the change in the pixel voltage $\Delta V_{px}$ across the pixel $C_{DE}$ is approximately equal to the change in the storage capacitor voltage $\Delta V_{st}$ across the storage capacitor $C_{st}$, i.e., $\Delta V_{px} \approx \Delta V_{st}$. This approximation holds true particularly when $C_{st}$ is the dominant capacitor, which should be the case. A more exact relation between $V_{px}$ and $V_{st}$ is given by equation (1):

$$\Delta V_{px}=(\Delta V_{st})[(C_{st})/(C_{TOTAL})] \quad (1)$$

where $\Delta V_{px} \approx \Delta V_{st}$ when $C_{TOTAL} \approx C_{st}$ and thus $(C_{st})/(C_{TOTAL}) \approx 1$ The total pixel capacitance $C_{TOTAL}$ is defined as shown in equation (2) as the sum of all capacitance, namely:

$$C_{TOTAL}=C_{st}+C_{DE}+C_{rest} \quad (2)$$

where $C_{rest}$ is the sum of all other capacitance (including parasitic capacitance) in the pixel.

Further it should be noted that, in addition to expressing the change in the pixel voltage $\Delta V_{px}$ (at node P in FIG. 5) in terms of the change in the voltage $\Delta V_{st}$ (across the storage capacitor $C_{st}$) as shown in equation (1), $\Delta V_{px}$ may be expressed in terms of the change in the common voltage $\Delta V_{CE}$ as shown in equation (3):

$$\Delta V_{px}=(\Delta V_{st})[(C_{st})/C_{TOTAL})]=(\Delta V_{CE})[(C_{DE})/(C_{TOTAL})] \quad (3)$$

where $C_{DE}$ is capacitance of the display effect or pixel.

It is desired not to effect the voltage across the pixel $V_{EP}$ and thus not to effect the displayed image when voltages are changed. Having no display effects or no pixel voltage change means that $\Delta V_{EP}=0$.

Since $V_{EP}=V_{CE}-V_{px}$ then:

$$\Delta V_{EP}=\Delta V_{CE}-\Delta V_{px}=0 \quad (4)$$

Equation (4) indicates the desirable maintenance of the displayed image with substantially no changes in display effects when voltages are changed. That is, the change in the voltage across the pixel $\Delta V_{EP}$ is desired to be zero so that black or white states are maintained without any substantial change, for example.

Substituting $\Delta V_{px}$ from equation (3) into equation (4) yields:

$$\Delta V_{CE}-(\Delta V_{st})[(C_s/C_{TOTAL})]=0 \quad (5)$$

It can be seen from equation (5) that the relation between $\Delta V_{CE}$ and $\Delta V_{st}$ may be given by equations (6) and (7)

$$\Delta V_{CE}=(\Delta V_{st})[(C_s/C_{TOTAL})] \quad (6)$$

$$\Delta V_{st}=(\Delta V_{CE})[(C_{TOTAL}/C_{st})] \quad (7)$$

Thus, when the common electrode voltage is changed by an amount $\Delta V_{CE}$, then it is desired to change the voltage on the storage line by $\Delta V_{st}$ that satisfies equation (7).

As seen from equation (6) or (7), in order to prevent any voltage change $\Delta V_{EP}$ across the pixel $C_{DE}$ i.e., to ensure that $\Delta V_{EP}=0$, and thus substantially maintain the same display effect with substantially no change of the displayed image, the common voltage $V_{CE}$ and the storage capacitor voltage $V_{st}$ are changed at substantially the same time and by substantially the proper amount with respect to each other as shown by equations (6) or (7). In particular, when $V_{st}$ and $V_{CE}$ are changed by amounts that satisfy equation (6) or (7) and at substantially the same time, then there will be no change in the voltage across the pixel $C_{DE}$, i.e., $\Delta V_{EP}=0$.

The voltage across the pixel capacitor $C_{DE}$, i.e., the voltage difference between the common electrode 102 and the pixel node P (i.e., $V_{EP}$) is responsible for switching of the display and forming an image along with the rest of the pixel matrix array. If the potential on the common electrode 102 and the storage capacitor line 340 are changed at substantially the same time (e.g., the two are connected together or are under the control of the same controller 515), and with amounts that substantially satisfy equation (6) or (7), then the potential at the pixel node P will change by substantially the same amount as the potential change of the common electrode voltage and at substantially the same time. Effectively, this means that voltage $V_{EP}$ across the pixel capacitor $C_{DE}$ remains constant (i.e., $V_{EP}=0$).

On the other hand, if the common electrode 102 and the storage capacitor line 340 are not connected together or under the control of the same controller, then a voltage $V_{CE}$ change of the common electrode 102 will also have an effect or change the voltage $V_{EP}$ across the pixel capacitor $C_{DE}$. That is, the change in the common electrode potential $V_{CE}$ will have an effect on the whole display. Further, if the common electrode potential $V_{CE}$ is changed while a row is selected (i.e., TFT 310 is closed or conducting), it will result in a different behavior for that selected row and will result in image artifacts.

It should be noted that the storage capacitor $C_{st}$ in an active-matrix circuit designed to drive the E-ink (or pixel/display effect capacitor $C_{DE}$) is 20 to 60 times as large as the display effect capacitor $C_{DE}$ and gate-drain capacitors $C_{gd}$. Typically, the value of the display effect capacitor $C_{DE}$ is small due to the large cell gap of the E-ink and the relatively large leakage current of the E-ink material. The leakage current is due to a resistor 350 (see FIG. 3) in parallel with the display effect capacitor $C_{DE}$. The small value of the display effect capacitor $C_{DE}$ coupled with the leakage current require a relatively large storage capacitor $C_{st}$.

The various electrodes may be connected to voltage supply sources and/or drivers which may be controlled by a controller 515 that controls the various voltage supply sources and/or drivers, shown as reference numerals 520, 530, 570, connected to the row electrode 320, the column electrode 330, and the common electrode 102, respectively. The controller 515 drives the various display electrodes or lines, e.g., pixel cell shown in the equivalent circuit 500, with pulses having different voltage levels as will be described.

To realize the proper amount and timing of changes of the voltages of the storage capacitor voltage $V_{st}$ and common voltage $V_{CE}$, namely changing both storage and common voltages $V_{st}$, $V_{CE}$ at substantially the same time and by substantially the proper amount, namely, $\Delta V_{st}=(\Delta V_{CE})[(C_{TOTAL}/C_{st})]$, as shown in equation (7), the common electrode driver 570 may be connected to the storage capacitor line 340 through a storage driver 580 which may be programmable or controllable by the controller 515. In this case the storage driver 580 is a scalar which generates an output signal $V_{st}$ that corresponds to the common voltage $V_{CE}$. In other words, the voltage $V_{st}$, of the output signal varies proportionally, preferably linearly proportionally with the common voltage $V_{CE}$. Alternatively the storage driver 580 may be a driver separate from controller 515. In this case the connection between the common electrode driver 570 and the storage driver 580 is superfluous. The controller 515 may be configured to change the storage and common voltages $V_{st}$, $V_{CE}$ at substantially the same time and control the storage driver 580 such that the storage and common voltage changes correspond, e.g. satisfy the relationship shown by equation (6) or (7), for example.

Figure 6:
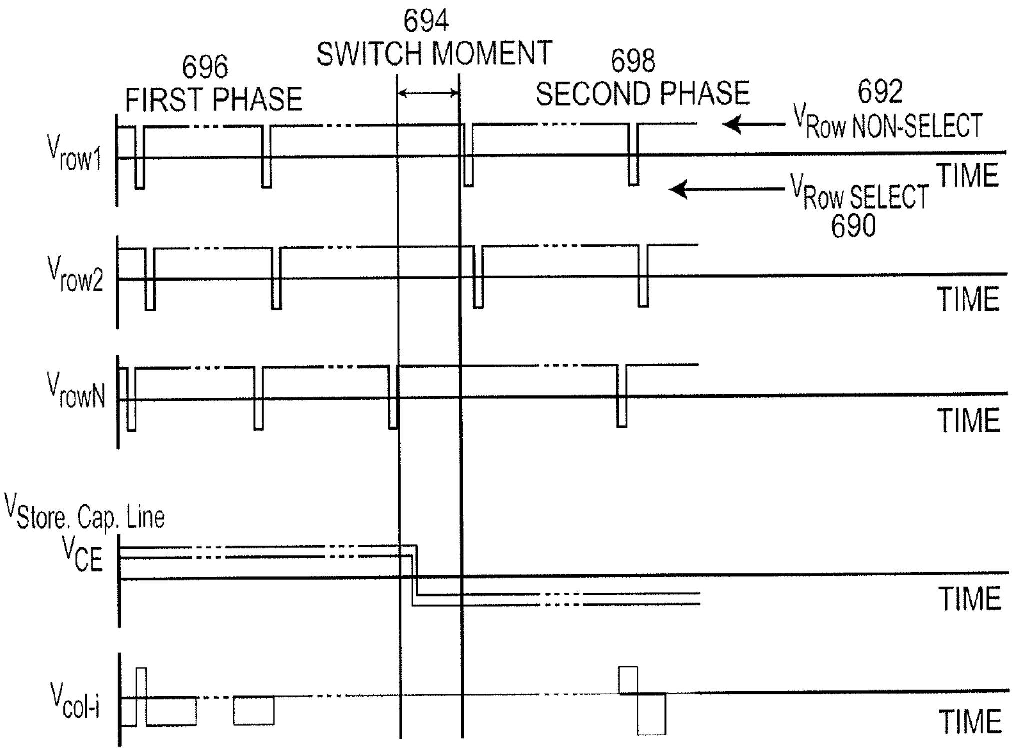
FIG. 6 shows an example of a timing diagram for switching voltages.

Artifacts may result in the displayed image if the storage and common voltages $V_{st}$, $V_{CE}$ are not switched at the substantially same time. Further, preferably, as shown in FIG. 6, the storage and common voltages $V_{st}$, $V_{CE}$ are not only switched at substantially the same time, but also are switched when none of the rows are selected. Alternatively the $V_{CE}$ and $V_{st}$ are switched at substantially the same time: (1) at the start of any row selection time; or (2) during a row selection time after which the selected row gets at least a full row selection period to charge the pixels to the column voltage level. In particular, preferably the switch of the Vce and the Vst does not result in one or more pixels being charged to an incorrect voltage (i.e. another voltage than the column voltage).

FIG. 6 shows row or gate voltages of rows 1, 2 and N, where a low level 690 $V_{row\text{-}select}$, for example, selects a row or turns ON the TFT 510 (conductive state, switch closed), and a high level 692 $V_{row\ non\text{-}select}$ turns OFF the TFT 510 (non-conductive state, switch open). The rows are sequentially selected one at a time by applying an appropriate voltage level on a row, where none of the rows are selected during switching time period 694 separating first and second phases 696, 698, respectively. Although not relevant from the timing point of view of the changes in the common voltages $V_{st}$, $V_{CE}$, the column voltage is also shown in FIG. 6 for illustrative purposes. It should be noted that the switching time period 694 may occur during any desired time where the sequential row addressing is interrupted, such as after all the rows are addressed, or half the rows are addressed or after any number of rows are addressed, as desired. After the switch period 694, the next row is addressed and the sequential row addressing is resumed.

The controller 515 may be any type of controller and/or processor which is configured to perform operation acts in accordance with the present systems, displays and methods, such as to control the various voltage supply sources and/or drivers 520, 530, 570 to drive the display 500 with pulses having different voltage levels and timing as will be described. A memory 517 may be part of or operationally coupled to the controller/processor 515.

The memory 517 may be any suitable type of memory where data are stored, (e.g., RAM, ROM, removable memory, CD-ROM, hard drives, DVD, floppy disks or memory cards) or may be a transmission medium or accessible through a network (e.g., a network comprising fiber-optics, the world-wide web, cables, or a wireless channel using time-division multiple access, code-division multiple access, or other radio-frequency channel). Any medium known or developed that can store and/or transmit information suitable for use with a computer system may be used as the computer-readable medium and/or memory. The memory 517 or a further memory may also store application data as well as other desired data accessible by the controller/processor 515 for configuring it to perform operation acts in accordance with the present systems, displays and methods.

Additional memories may also be used. The computer-readable medium 517 and/or any other memories may be long-term, short-term, or a combination of long-term and short-term memories. These memories configure the processor 515 to implement the methods, operational acts, and functions disclosed herein. The memories may be distributed or local and the processor 515, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within the memory 517, for instance, because the processor 515 may retrieve the information from the network for operation in accordance with the present system.

The processor 515 is capable of providing control signals to control the voltage supply sources and/or drivers 520, 530, 570 to drive the display 500, and/or performing operations in accordance with the various addressing drive schemes to be described. The processor 515 may be an application-specific or general-use integrated circuit(s). Further, the processor 515 may be a dedicated processor for performing in accordance with the present system or may be a general-purpose processor wherein only one of many functions operates for performing in accordance with the present system. The processor 515 may operate utilizing a program portion, multiple program segments, or may be a hardware device, such as a decoder, demodulator, or a renderer such as TV, DVD player/recorder, personal digital assistant (PDA), mobile phone, etc, utilizing a dedicated or multi-purpose integrated circuit(s).

Any type of processor may be used such as dedicated or shared one. The processor may include micro-processors, central processing units (CPUs), digital signal processors (Dips), Asics, or any other processor(s) or controller(s) such as digital optical devices, or analog electrical circuits that perform the same functions, and employ electronic techniques and architecture. The processor is typically under software control for example, and has or communicates with memory that stores the software and other data such as user preferences.

Clearly the controller/processor 515, the memory 517, and the display 500 may all or partly be a portion of single (fully or partially) integrated unit such as any device having a display, such as flexible, roll able, and wrap able display devices, telephones, electrophoresis displays, other devices with displays including a PDA, a television, computer system, or other electronic devices. Further, instead of being integrated in a single device, the processor may be distributed between one electronic device or housing and an attachable display device having a matrix of pixel cells 500.

Figure 8A:
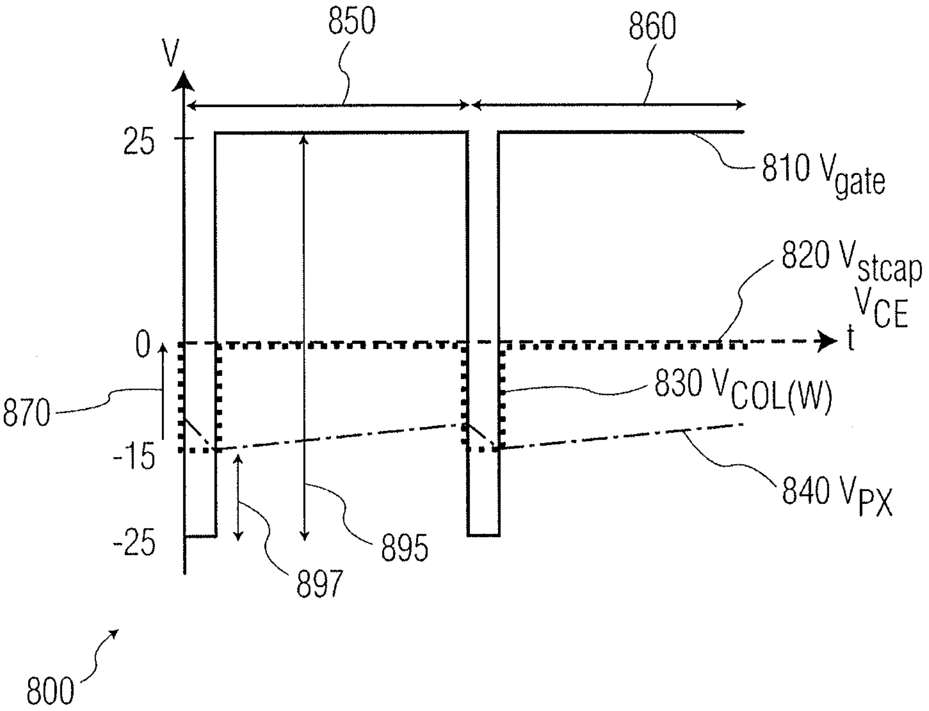
FIGS. 8A-8B show exemplary waveforms for two frames using a HVD sequential active-matrix drive scheme.
Figure 8B:
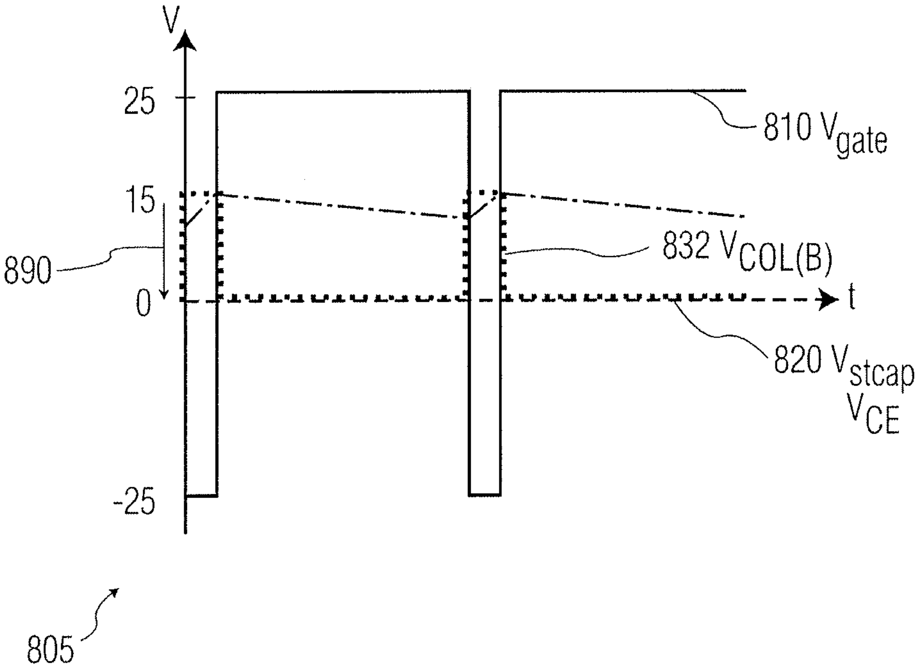
Figure 9A:
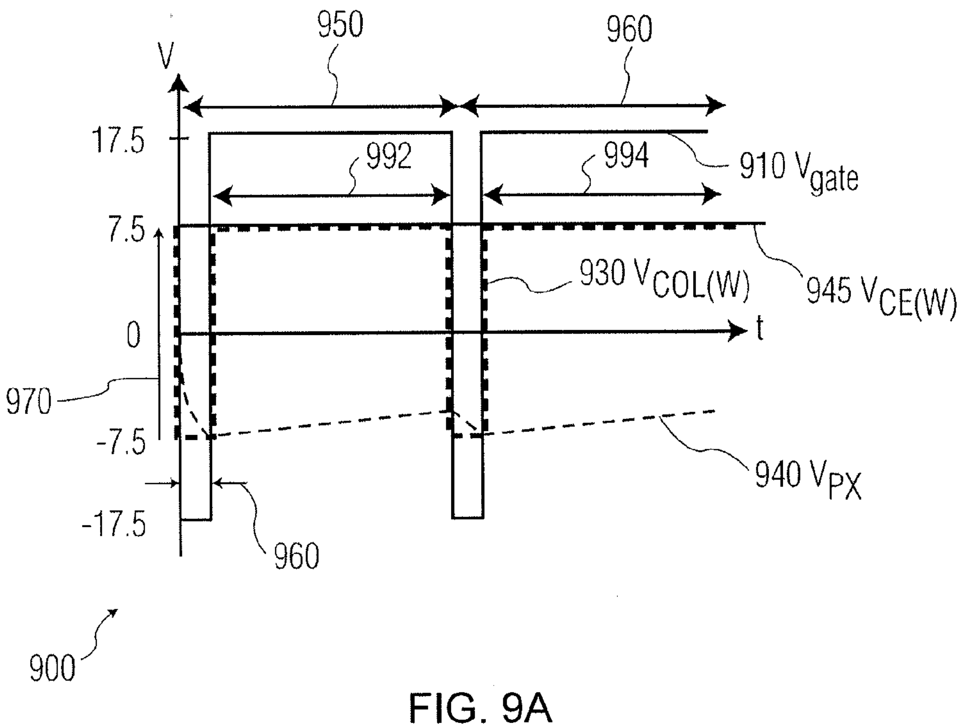
FIGS. 9A-9B show exemplary waveforms for two frames using a LVD sequential active-matrix drive scheme.
Figure 9B:
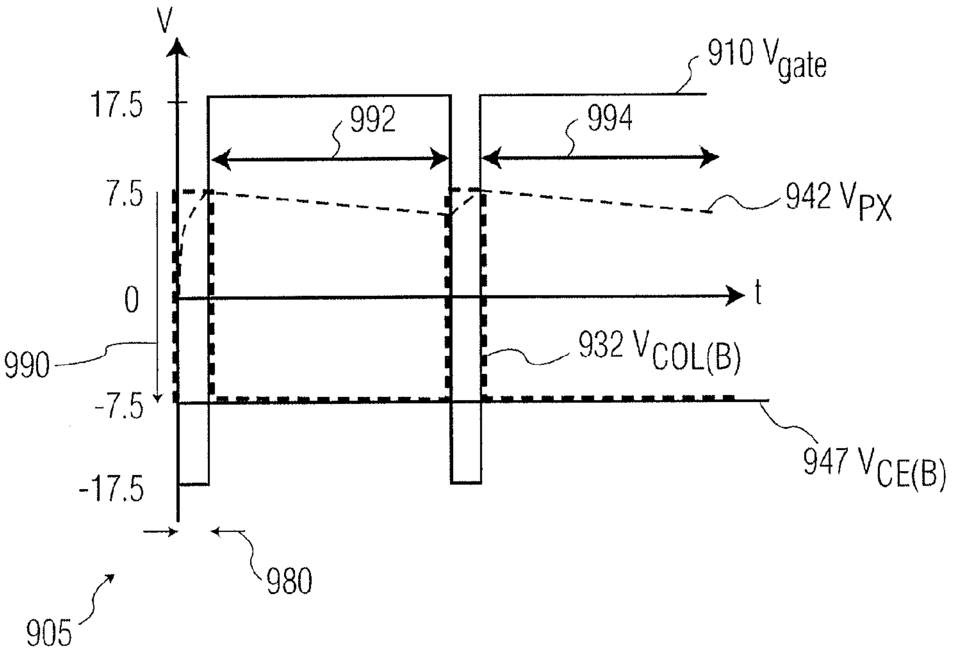

In FIGS. 8A-8B, a conventional drive scheme is shown and in FIGS. 9A-9B, a drive scheme according to one embodiment is shown with column voltages that are twice as low as that of the conventional drive scheme shown in FIGS. 8A-8B.

FIGS. 8A-8B show voltage levels of various signals versus time for two frames using a conventional active-matrix drive scheme 800, 805, respectively. The solid curve 810 shows the voltage on one row $V_{row}$, which is the gate voltage $V_{gate}$ of the TFT 310 (FIG. 3). The gate or row $V_{row}$ (or $V_{gate}$) has a gate swing 895 between +25V and −25 V. The 0V DC voltage curve shown as dashed line 820 is the voltage on the corresponding storage capacitor line 340 shown in FIGS. 3 and 5, as well as the common electrode voltage $V_{CE}$ also shown in FIGS. 3 and 5. The dotted curve 830 is the voltage on a column $V_{col}$ which is between +15V and −15 V. The dashed curve 840 is the pixel voltage $V_{px}$ (at node P) applied to the pixel attached to the row and the column, represented by the pixel capacitor CDD shown in FIGS. 3 and 5.

FIG. 8A shows a negative dotted curve or $V_{col}$ 830 and a corresponding negative pixel voltage $V_{px}$, such as −15 V (e.g., a white pixel) applied to node P of FIGS. 3 and 5, which is the pixel electrode 160 shown in FIG. 1. As shown by the dashed curve or $V_{px}$ 840, the negative pixel voltage $V_{px}$ that begins to discharge slightly (where its value tends towards zero volts) upon turning OFF the TFT switch 310 (FIG. 3 or opening the switch 510 shown in FIG. 5) by the gate or row $V_{row}$, i.e., $V_{row}$=+25V. FIG. 8B shows a positive dotted curve or $V_{col}$ 832 and a corresponding positive pixel voltage $V_{px}$, such as +15 V (e.g., a black pixel), where the positive pixel voltage $V_{px}$ 842 begins to also discharge slightly (where its value tends towards zero volts) upon turning OFF the TFT switch 310 (FIG. 3) by the gate or row $V_{row}$, (i.e., $V_{row}$=+25V).

As shown by the dashed curve or $V_{px}$ 840, 842, the pixel voltage $V_{px}$ starts at 0 V before the first frame 850, discharge slightly and is close to the required pixel voltage at the start of the second frame 860. Although the column electrode voltage $V_{col}$ 830, 832 is 0V between two row selection or gate pulses 810, the column voltage in an actual or real display may not be quite 0V because the other pixels attached to the column are addressed. The pulses shown in FIGS. 8A-8B are typical pulses in a polymer electronics active-matrix back plane with p-type TFTs. For n-type TFTs (e.g. amorphous silicon), the polarity of the row pulses are inverted.

FIGS. 9A-9B show voltage levels of the signals comparable to those shown in FIGS. 8A-8B versus time for two frames using a black and white or color sequential active-matrix drive scheme 900, 905 according to one embodiment of the present display and drive method. Although the two common electrode voltage levels are associated with switching to black and to white, it should be understood that any two colors may be associated with the two voltage levels.

Similar to curves shown in FIGS. 8A-8B, in FIGS. 9A-9B, the solid curve 910 shows the voltage on one row $V_{row}$. The dotted curves 930, 932 are the voltage levels on a column $V_{col}$. The dashed curves 940, 942 are the pixel voltage levels $V_{px}$ applied at node P of the pixel that is attached to the row and the column. The solid lines 945 at 7.5V in FIGS. 9A and 947 at −7.5V in FIG. 9B show the common electrode voltage $V_{CE}$.

It should be noted that the column voltage $V_{col}$ 930 in FIGS. 9A-9B is reduced to be between +7.5V and −7.5 V, instead of +15V and −15 V as in FIGS. 8A-8B. As shown in FIG. 9A, when the column voltage $V_{col}$ 930 is −7.5V and a pixel is addressed at time period 960, i.e., when the gate or row $V_{row}$ voltage is −17.5 V and the TFT 310 (FIG. 3) or switch 510 (FIG. 5) is open, the common electrode voltage $V_{CE}$ 945 is +7.5V (instead of 0V in FIGS. 8A-8B). Thus, the potential rise (arrow 970) or voltage across the pixel or $C_{DE}$ (FIG. 5), namely, $V_{CE}$−$V_{px}$ is +7.5−(−7.5V)=+15V, which is the same potential rise (arrow 870) or voltage across the pixel $C_{DE}$ shown in FIG. 8A, namely, 0−(−15V)=+15V.

Similarly, as shown in FIG. 9B, when the column voltage $V_{col}$ 930 is +7.5V when a pixel is addressed at time period 980, then the common electrode voltage $V_{CE}$ 947 is −7.5V, instead of 0V as shown by reference numeral 820 in FIG. 8B. Thus, the potential drop (arrow 990) or voltage across the pixel $C_{DE}$, namely, $V_{CE}$−$V_{px}$ is −7.5 V−(+7.5V)=−15V, which is the same potential drop (arrow 990) or voltage across $C_{DE}$ shown in FIG. 8A, namely, 0−(+15V)=−15V.

As described, the drive methods shown in FIGS. 8A-8B and 9A-9B have the same potential (rise or drop) across the pixel $C_{DE}$ of 15V, but this 15V potential difference across the pixel $C_{DE}$ in the drive method shown in FIGS. 9A-9B is achieved with a reduced absolute voltage levels, such as the column voltage $V_{col}$ being reduced to +7.5V from the +15V level shown in FIG. 9B, and also shown in FIG. 9A where the absolute value of the column voltage $V_{col}$ is reduced to 7.5V from 15V.

Correspondingly, as compared to the conventional drive scheme 800, 805 shown in FIGS. 8A-8B, the column voltage $V_{col}$ 930, 932 is also reduced to between +7.5V and −7.5V (from ±15 in FIGS. 8A-8B). The gate or row voltage $V_{row}$ or $V_{gate}$910 is also reduced in the color sequential active-matrix drive scheme 900, 905 shown in FIGS. 9A-9B. In particular, the gate or row $V_{row}$ is changed or reduced to be between +17.5V and −17.5V instead of ±25 of the conventional drive scheme 800, 805 shown in FIGS. 8A-8B.

As shown in FIGS. 9A-9B, the pixel voltage $V_{px}$ starts at 0V before the first frame 950, while it is close to the required pixel voltage at the start of the second frame 960. The column voltage $V_{col}$ is equal to the common electrode voltage $V_{CE}$, (e.g., equal to +7.5V in FIG. 9A and −7.5V in FIG. 9B) when a pixel is not switched during the addressing phase (i.e., when the gate or row voltage $V_{row}$ is +17.5V). In FIG. 8A, the pixel is charged to $V_{px}$=−7.5V (e.g. switching towards white), while the common electrode is set to +7.5 V. The reference voltage (or the level of the column voltage $V_{col}$ applied to the other pixels during time periods 992, 994) is +7.5 V for the other pixels that are not switched during this addressing phase 992, 994 (i.e., when the gate or row voltage $V_{row}$ is +17.5V). In FIG. 8B, the pixel is charged to +7.5 V (e.g., switching towards black), while the common electrode is set to −7.5 V. The reference voltage is −7.5 V for pixels that are not switched during this addressing phase 992, 994. The curves in FIGS. 9A-9B are the pulses as applied in a polymer electronics active-matrix back plane with p-type TFTs. For n-type TFTs (e.g., amorphous silicon), the polarity of the row pulses are inverted.

By choosing a different common electrode voltage $V_{CE}$ for the two drive phases, namely +7.5V during the ‘white’ phase shown in FIG. 9A and −7.5V during the ‘black’ phase shown in FIG. 9B, the display is addressed with a column voltage swing 970, 990 of 15V (e.g. between −7.5V and +7.5 V), which is twice as low as the column voltage swing of 30V used in the conventional addressing scheme shown in FIGS. 8A-8B by the combination of arrows 870 and 890, where the column voltage swing of 30V is between ±15V.

The voltage across the pixel $V_{EP}$ (FIG. 5) during the ‘white’ phase (FIG. 9A) is −15V for the pixels that are switched towards the white state and 0V for the pixels that are not switched during this addressing phase. That is, those pixels (that are not switched) are charged at node P (FIG. 5) to +7.5V, where +7.5V is equal to the common electrode voltage $V_{CE}$ (FIG. 9A) thus resulting in a voltage across the pixel $V_{EP}$ of 0V.

The voltage across the pixel $V_{EP}$ during the ‘black’ phase (FIG. 9B) is +15V for the pixels that are switched towards the black state and 0V for the pixels that are not switched during this addressing phase. That is, those pixels (that are not switched) are charged at node P (FIG. 5) to −7.5V, where −7.5V is equal to the common electrode voltage $V_{CE}$ (FIG. 9B) thus resulting in a voltage across the pixel $V_{EP}$ of 0V.

The voltage levels $V_{EP}$ across the pixel capacitor $C_{DE}$ (FIG. 5) of ±15V may be changed to ±7.5V by providing a column voltage $V_{col}$ of 0V or alternatively a common voltage $V_{CE}$ of 0V (instead of ±7.5V). When $V_{col}$ (or $V_{CE}$) is 0V, the voltage levels across the pixel $V_{EP}$ is ±7.5V (instead of ±15V), namely, from −7.5 V (‘white’ phase) to +7.5 V (‘black’ phase). Providing two different voltage levels across the pixel $V_{EP}$, e.g., ±15V and ±7.5V, allows driving a pixel between black and white with two different speeds. As the column voltage level is applied for each individual pixel during addressing of the display, the LVD addressing scheme provides for additional voltage levels $V_{EP}$ compared to HVD when using the same multi-level column drivers.

It should be noted that, with the drive scheme according the various described embodiments, the voltage $V_{EP}$ across the pixel capacitor $C_{DE}$, i.e., ±15V swing, are identical to the conventional drive scheme, as seen from arrows 870, 890 in FIGS. 8A-8B and arrows 970, 990 in FIGS. 9A-9B. However, the required column voltages $V_{col}$ are reduced, by a factor of 2, from 15V (reference numeral 830 in FIGS. 8A-8B) to 7.5V (reference numeral 830 in FIGS. 8A-8B).

Figure 7:
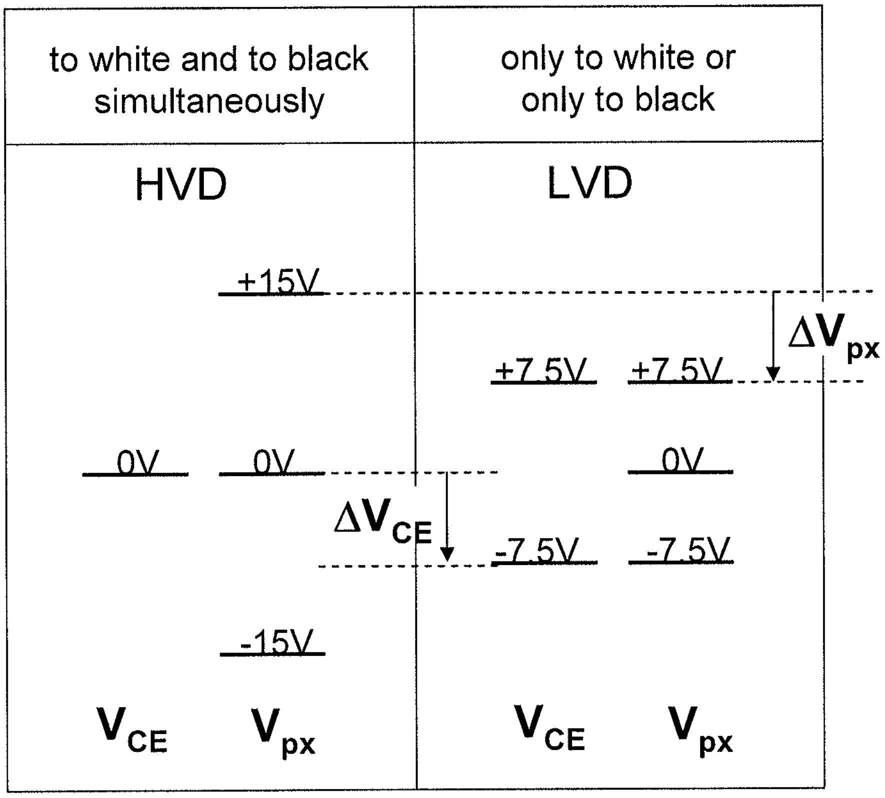
FIG. 7 shows voltage levels used for different driving modes: HVD (high voltage driving), and LVD (low voltage driving)

FIG. 7 shows the $V_{CE}$ and $V_{px}$ voltage levels used for the HVD and LVD modes.

For the color sequential drive scheme 900, 905 shown in FIGS. 9A-9B, the total image update time will be longer than the conventional drive scheme 800, 805 of FIGS. 8A-8B, due to the fact that driving of the pixels to the different colors is sequential in time instead of at the same time. However, due to the fact that an image update for electrophoretic displays always has a number of stages to drive the display from the previous image to the new image, the reduction in image update time will typically be a factor between 1.1 and 2, depending on the update sequence chosen. When the conventional addressing scheme 800, 805 was used with twice as low column voltages, i.e. 7.5V instead of 15V, the image update time increased by more than a factor 2 or 3; where for the color sequential drive scheme 900, 905 of FIGS. 9A-9B, the factor is between 1.1 and 2. That is, with reduced column voltage levels of ±7.5V (instead of the ±15V of FIGS. 8A-8B) for both drive schemes shown in FIGS. 8A-8B and FIGS. 9A-9B, the increase in image update time (or decrease in image update speed) is less for the color sequential drive scheme 900, 905 of FIGS. 9A-9B, as compared to the conventional drive scheme 800, 805 of FIGS. 8A-8B.

As seen from FIGS. 8A-8B and 9A-9B, the row or gate voltage $V_{row}$ (or $V_{gate}$) may also be lowered accordingly, e.g., from 25V to 17.5V. In the conventional drive scheme shown in FIGS. 8A-8B, the row select voltage is −25 V, while the row non-select voltage was +25 V (e.g. 10 V lower and higher than the column voltages of ±15V). In the color sequential addressing scheme shown in FIGS. 9A-9B, the row select and non-select voltages are −17.5 V and +17.5 V, respectively, while the pixel charging properties remain identical to the conventional addressing scheme (of FIGS. 8A-8B) since the maximum and minimum voltage across the pixel $V_{EP}$ is the same in both the conventional (FIGS. 8A-8B) and color sequential drive (FIGS. 9A-9B) schemes, namely, ±15V as seen from arrows 870, 890 and 970, 990 in FIGS. 8A-8B and 9A-9B, respectively.

It should also be noted that, instead of having large values for the common electrode voltage $V_{CE}$, such as ±7.5V (FIGS. 9A-9B), the value or level of the common electrode voltage $V_{CE}$ may be chosen to be 0V, (similar to $V_{CE}$ level of FIGS. 8A-8B) or a small positive voltage equal to the kickback, during the two (white and black pixel) addressing phases shown in FIGS. 9A-9B. In the case where the $V_{CE}$ level is approximately 0V, the column and row voltages can be chosen differently during the two addressing phases of FIGS. 9A-9B to maintain the same voltage difference $V_{EP}$ across the pixel capacitor $C_{DE}$ (FIG. 5) e.g., of approximately ±15V.

Kickback refers to the following phenomenon. During the conducting state of the TFT ($V_{row}$=−17.5V for a p-type TFT) the small gate-drain parasitic capacitor $C_{gd}$ and the capacitors $C_{st}$ and $C_{DE}$ will be charged (FIGS. 3 and 5). At the moment that the TFT is switched off ($V_{row}$ will be switched to 17.5V for a p-type TFT) the voltage over capacitor $C_{gd}$ will increase by 35V (from −17.5V to +17.5V). Charges will move from $C_{gd}$ to $C_{st}$ and $C_{DE}$ resulting in an increase of $V_{px}$ just after the TFT is switched off. Because $C_{gd}$ is relatively small compared to the other capacitors, the increase of the potential of $V_{px}$ is also small. For n-type TFTs this effect is the reverse, i.e. the kickback voltage will have a negative value.

In general, a small additional $\Delta V_{CE}$ is required on top of the mentioned $V_{CE}$ voltages (e.g., on top of −7.5, 0, +7.5V). The reason is that parasitic capacitances (e.g., $C_{gd}$) in the pixel cause a small voltage jump when the row changes from low to high voltage. This jump is called the kickback voltage $V_{KB}$ and can be calculated as follows: $\Delta V_{KB}=\Delta V_{row}(C_{gd}/C_{TOTAL})$. This must be added to $V_{CE}$ in order to have the right $V_{EP}$. Thus, it should be understood that this small additional kickback voltage should be added to all the described $V_{CE}$ voltages.

It should further be noted that the power consumption (of the color sequential addressing scheme of FIGS. 9A-9B) is lower (than that for the conventional addressing scheme of FIGS. 8A-8B), because power consumption is proportional to the square of drive voltages, such as the column, row and common electrode voltages which together are responsible for a certain voltage $V_{EP}$ over pixel capacitor $C_{DE}$ (which makes the ink switch). Changes to $V_{row}$ and $V_{col}$ and $V_{CE}$ contribute to the power consumption by a square relationship.

So, the advantages and inconveniences of the HVD scheme and LVD scheme can be summarized as follows: High voltage pixel driving (HVD) allows driving of pixels to White and to Black simultaneously. During a full frame either +15V (to Black) or −15V (to White) is written on a pixel which requires a voltage swing of 30V on the columns. Since switching is not so fast, generation of grey scales can be accomplished by pulse width modulation, i.e., by applying the + or −15V voltage to a pixel for a smaller or larger number of frames. So, in this context, pulse width modulation refers to the fact that the grey scales on the display are created by applying a certain voltage (pulse) for a certain amount of time (pulse width). The combination of the voltage level and the time that is applied thereto creates the grey level on the display. This in contract to amplitude modulation used in Liquid Cristal displays, where the display is driven by applying a certain voltage amplitude for a fixed amount of time or during the time a certain grey scale corresponding to the voltage amplitude has to be presented to the user.

Low voltage driving (LVD) reduces the voltage swing of the column voltages $V_{col}$ by applying a variable common voltage $V_{CE}$ to the common terminal 102 such that the voltage across the pixel $V_{EP}=V_{CE}-V_{px}$ remains the same. The price to pay is that during one frame it is now only possible to either switch a pixel to White ($V_{CE}$=+7.5V) or to switch a pixel to Black ($V_{CE}$=−7.5V). It is however possible to have a fast switch ($V_{col}$=7.5V; 15V over E Ink) and a slow switch ($V_{col}$=0V; 7.5V over E Ink), which helps realizing more grey levels.

Now with reference to FIGS. 10-16 an exemplary embodiment of a super low voltage driving (SLVD) scheme according to the invention will be described, which is implemented on the active matrix pixel circuit of FIG. 5. The controller 515 controls the driving schemes discussed herein by providing control signals to control the voltage supply sources and/or drivers 520, 530, 570.

Figure 10:
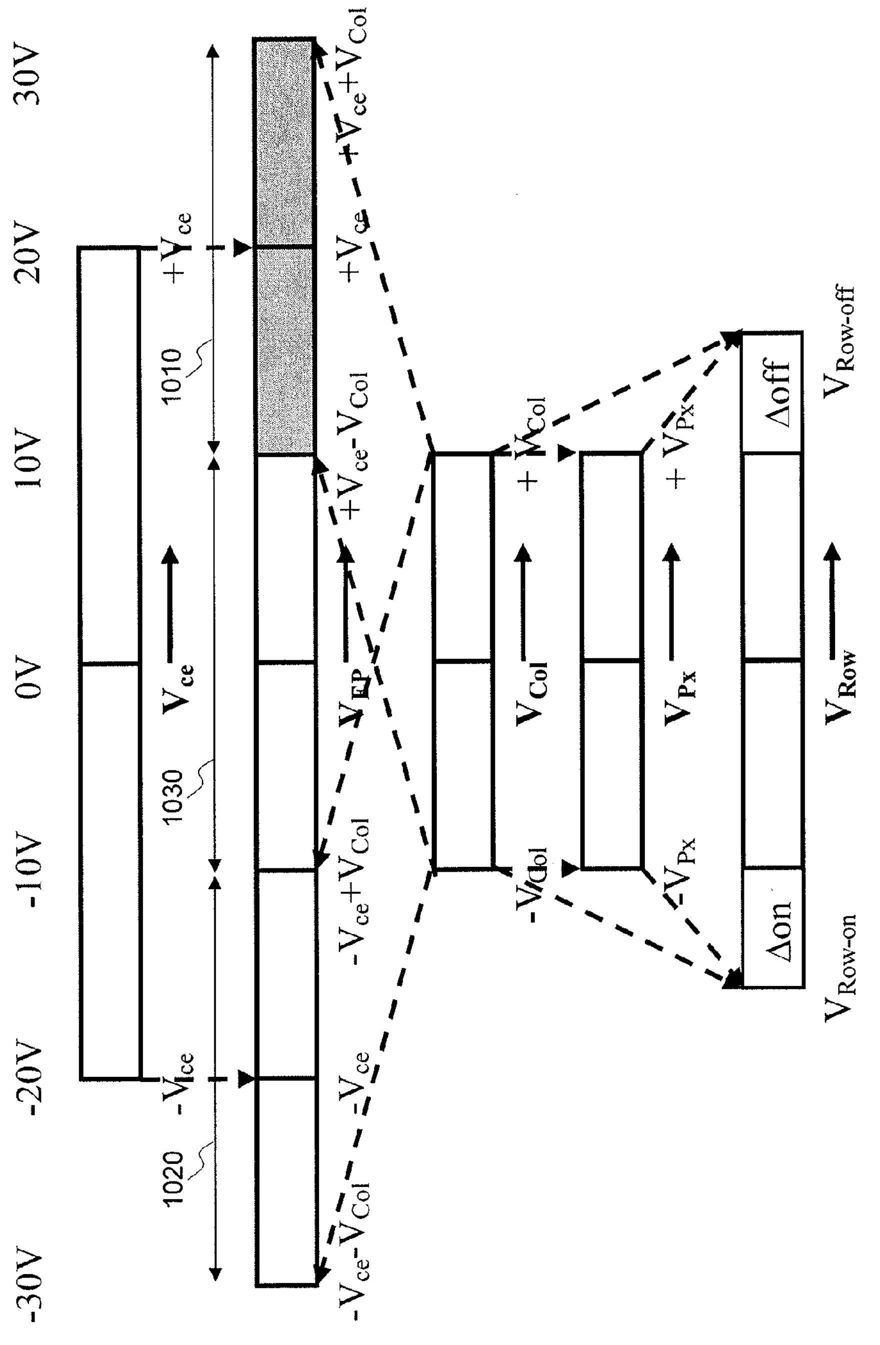
FIG. 10 shows exemplary voltage values of a SLVD (super low voltage driving) scheme according to an embodiment of the present invention.

As shown in FIG. 10, a swing on the common voltage (i.e., an absolute value of the difference between the common voltage in the first pixel driving state and the common voltage in the second driving state) is larger than a swing on the column voltage (i.e., an absolute value of the difference between a maximum column voltage and a minimum column voltage) which can be provided by the column driver. Similarly, due to the fact that the pixel voltage is switched by applying the column voltage, a swing on the common voltage is larger than a swing on the pixel voltage (i.e., an absolute value of the difference between a maximum pixel voltage and a minimum pixel voltage during charging of the corresponding pixel). At other times (i.e., when the pixels are not charged) the pixel voltage may be smaller than the minimum pixel voltage shown in FIG. 10 or larger than the maximum pixel voltage due to capacitive coupling to other electrodes.

As in this exemplary embodiment, the common voltage $V_{CE}$ is modulated symmetrically around 0V between a positive voltage value $+V_{CE}$ and $-V_{CE}$, the absolute value of the common electrode voltage $V_{CE}$ is substantially larger than the absolute value of the column voltage $V_{col}$, by a predetermined offset value unequal to zero, which preferably is at least 5 V. The storage capacitor line voltage $V_{st}$ (not shown here) should be modulated with a proportional amplitude at substantially the same time as $V_{CE}$, similarly to the LVD scheme as described herein above for the Low Voltage Driving scheme with reference to FIG. 6. The column voltage, $V_{col}$, is chosen to be symmetric around 0V in this example. The pixel voltage, $V_{px}$, is determined by the column voltage in case of a conducting TFT transistor. The swing ($V_{row-off}-V_{row-on}$) on the row voltage, $V_{row}$, should always be larger than the swing ($+V_{col}-\!-V_{col}$) on the column voltage to ensure proper charging of the pixels and proper retention of charge on the pixels. Typical values of the difference $\Delta_{off}$ between $V_{row-off}$ and $+V_{col}$ and of the difference $\Delta_{on}$ (897 see FIG. 8) between $V_{row-on}$ and $-V_{col}$ are between 3 and 13V. The electrophoretic voltage, $V_{EP}$, is the voltage difference between the pixel electrode and the common electrode. In this example, it can be in a first range 1010 between $+V_{CE}-V_{col}$ and $+V_{CE}+V_{col}$. It may have three values: $+V_{CE}+V_{col}$, which in this example is +30V corresponding to the very fast-to-white-state, $V_{CE}$, which in this example is +20V corresponding to the fast-to-white state and $+V_{CE}+V_{col}$, which in this example is +10V corresponding to the slow-to-white state. It should be noted that in the slow-to-white state the pixel state is still driven towards white, although very slowly. The second range 1020 lies between $-V_{CE}-V_{col}$ and $-V_{CE}+V_{col}$. It may have three values: $-V_{CE}-V_{col}$, which in this example is −30V corresponding to the very fast-to-black-state, $-V_{CE}$, which in this example is −20V corresponding to the fast-to-black state and $-V_{CE}+V_{col}$, which in this example is −10V corresponding to the slow-to-black state. It should be noted that in the slow-to-black state the pixel state is still driven towards black, although very slowly. It should be noted that the voltage values given are only exemplary and may be different depending on the system and materials used. Furthermore, the effects of the kickback voltage are ignored in FIG. 10 and a p-type TFT is assumed in this example.

With the SLVD driving scheme, the column and row voltages may have smaller absolute values than with the LVD driving scheme and/or the voltages need to be applied for a smaller time period in order to reach a certain color state. So, in the latter the image update time is decreased. In both situations the power consumption of the display is reduced, since it depends on the voltages squared but of course also on the time that the voltages are applied to the active matrix. Furthermore, this also increases the operational lifetime as either the applied voltages to the active matrix are smaller and/or the time and/or the display will be driven a smaller fraction of the time.

However, as a result of the SLVD, the third range 1030 of the electrophoretic voltage, $V_{EP}$, which lies between $-V_{CE}+V_{col}$ and $+V_{CE}-V_{col}$ cannot be reached. Consequently, it is not possible anymore to apply 0V to any pixel (i.e., the voltage difference between the pixel electrode and the common electrode cannot be 0V anymore). Therefore all pixels are switching during a super low voltage drive state, as in general electrophoretic media only have a very small threshold and therefore start switching at voltages close to 0V. Furthermore, as discussed in more detail herein after without taking any countermeasures, the switching of the common electrode voltage $V_{CE}$ to and between the values belonging to the SLVD to black state and SLVD to white state could lead to voltage on the pixels leaking away or voltages that are potentially harmful to the circuitry.

Figure 11:
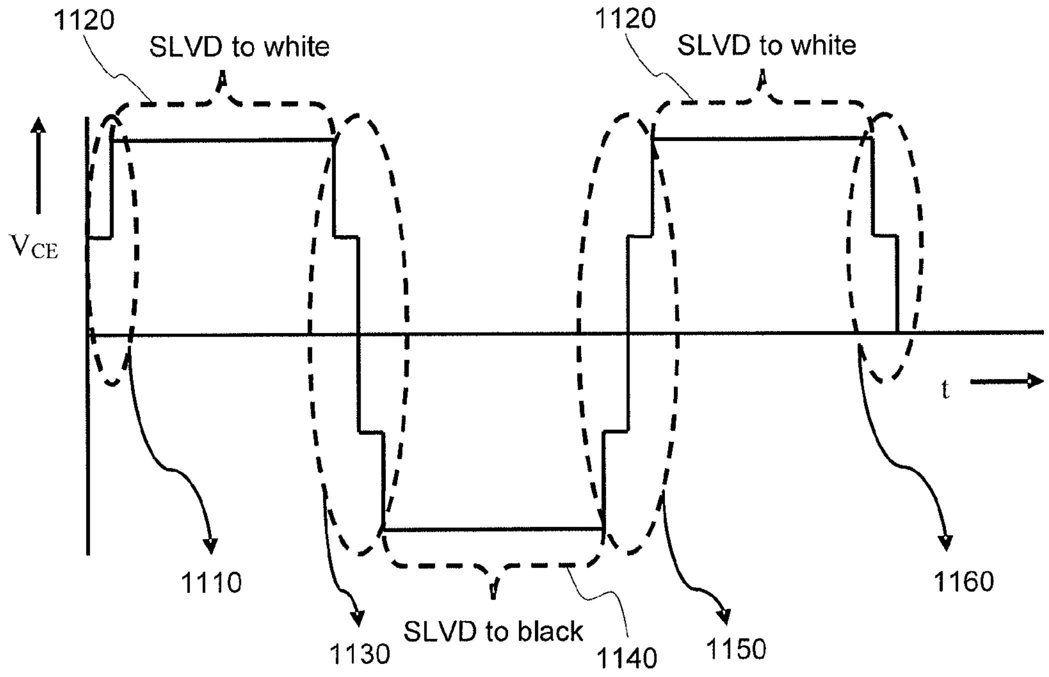
FIG. 11 shows an exemplary schematic outline of the switching of the common electrode voltage as a function of time, resulting in the various phases of the SLVD scheme.
Figure 12:
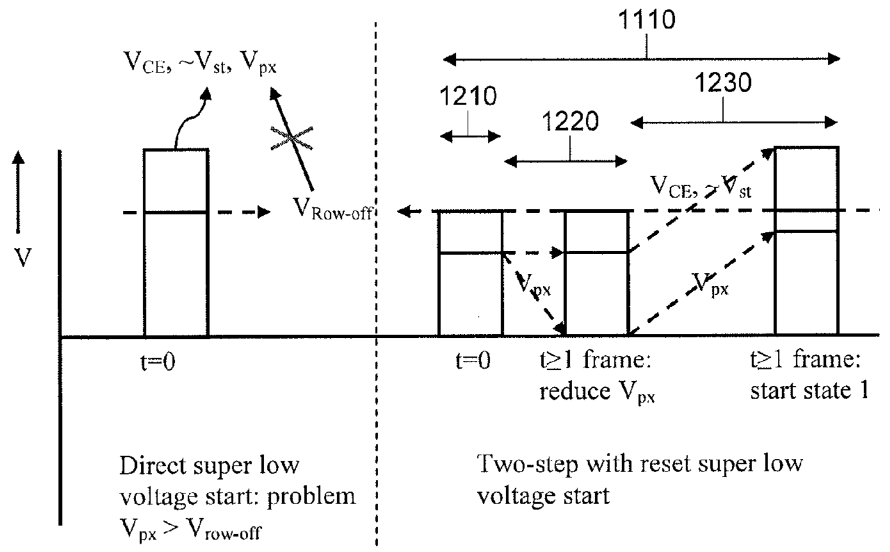
FIG. 12 shows the values of the common voltage and the pixel voltage during exemplary start up phases of the SLVD scheme.
Figure 13:
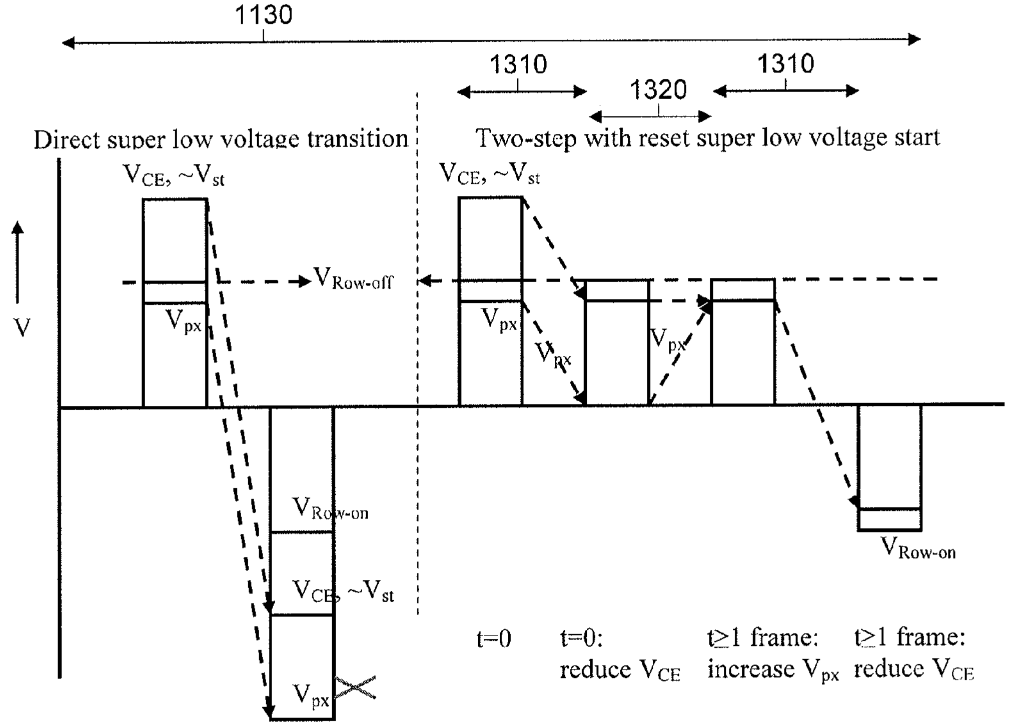
FIG. 13 shows the values of the common voltage and the pixel voltage during exemplary transition phases of the SLVD scheme.

This is better understood with reference to FIGS. 11-13. FIG. 11 shows an exemplary schematic outline of the switching of the common electrode voltage as a function of time, resulting in the various phases of the super low voltage drive (SLVD) scheme. Of course other phase sequences are possible. In this example, there is a startup phase 1110, which is followed by a Super-Low-Voltage (SLVD)-to-white phase 1120, a first type of transition 1130 from SLVD-to-white to SLVD-to-black, a Super-Low-Voltage (SLVD)-to-black phase 1140, a second type of transition 1150 from SLVD-to-black to SLVD-to-white, again a SLVD-to-white phase 1120 and finally a shutdown phase.

Before starting a new image update, all voltages on the display are 0V. To enter the first state 1120 of the super low voltage drive care has to be taken that the electrophoretic medium does not start to switch due to the presence of a certain $V_{EP}$ on the pixels during the change of the common voltage $V_{CE}$. More in particular, it should be avoided that the pixel voltage $V_{px}$ jumps to a level that causes the pixel switch to open as that will cause image artifacts.

In the example shown in FIG. 11 the common electrode is increased by +20V to reach the SLVD-to-white state 1120 and the storage capacitor lines are increased by a proportional amount. Since, the TFT transistors of the pixels are non-conducting at this time, executing this change (increase) in a single step would result in the pixel voltage $V_{px}$ increasing to +20V as well. As the $V_{row-off}$ in the example is only +15V the pixel voltage level would become too high to keep the TFTs in their non-conducting state and the voltage on the pixels would leak away. This is shown schematically in the left hand part of FIG. 12 for the case where a p-type TFT is used that becomes conducting when the pixel voltage is higher than $V_{row-off}$.

In order to avoid this, a two-step process with a reset may be applied, as shown in the right hand part of FIG. 12. In a first step 1210 the common electrode voltage $V_{CE}$ and the voltage on storage capacitor lines $V_{st}$ proportionally at substantially the same time are changed (increased) to a certain level, where the resulting pixel voltage $V_{px}$ is still small enough to keep the pixel switches in their non-conducting state. After that in a reset step 1220 the $V_{px}$ is reset to a lower voltage, for example 0V. This can be done in one frame time by selecting all rows of the display sequentially once and supplying 0V (or another low voltage level) to the pixels via the column electrodes. Subsequently, in a second step 1230 the common electrode voltage $V_{ce}$ and the storage capacitor line voltage $V_{st}$ are changed (increased) to their final value. As a result $V_{ce}$ and $V_{st}$ are at their respective super low voltage value, but $V_{px}$ is still small enough to keep the pixel switches in their non-conducting state. If needed, more than two steps with intermediate reset steps may be used to reach the desired value for $V_{ce}$. In the case when n-type TFTs are used as pixel switches the TFTs will become conducting when the pixel voltage becomes lower than a certain threshold determined by the properties of the TFT. In that case a high pixel voltage will not put the TFT into its conducting state, but a pixel voltage that is too high is still not desired as it can cause damage to the circuitry.

When the first super low voltage drive state is the SLVD-to-black 1140 having a $V_{CE}$ bias with an opposite polarity, also a two-step or multi-step startup phase may be needed, but this time to avoid pixel voltages that could potentially damage the circuitry when p-type TFT pixel switches are used. In the case when n-type TFT pixel switches are used care has to be taken that due to the reduction of the pixel voltage the TFT is not put in its conducting state causing image artifacts.

During the start-up phase, there is a time period wherein there are possible (absolute) values of the column electrode voltage $V_{col}$, which are larger than the (absolute) value of the common electrode voltage $V_{ce}$. So, during this period there is no SLVD driving state but a LVD-to-black or LVD-to-white pixel driving state as discussed herein above with reference to FIGS. 6, 7 and 9, although the exemplary voltage values shown in these figures are different from the values used here.

As shown in FIG. 11, there are two transition states 1130, 1150 from one SLVD state to the other SLVD state. These transitions are needed to protect the active-matrix from voltages that could potentially damage the circuitry and/or cause image artifacts due to voltages $V_{px}$ that put the pixel switch into its conducting state. In FIG. 13 an example is shown what would happen if the common electrode voltage $V_{ce}$ were switched from the value corresponding to the SLVD-to-white state to the SLVD-to-black-state. As shown in the left-hand side of FIG. 13, such a voltage change of 40 V would pull the pixel voltage $V_{px}$ to an absolute value larger than the absolute value of $V_{row\text{-}on}$, which could damage the backplane circuitry. As shown in the right-hand side, this can be avoided by a transition comprising a plurality of steps 1310, wherein $V_{ce}$ is changed (reduced), where in-between the steps there is a reset step 1320 of the pixel voltage $V_{px}$. In this reset step pixel voltage $V_{px}$ is changed in a direction opposite to the direction of the value change of the pixel voltage $V_{px}$ caused by the value change of the common voltage. This is achieved by supplying the desired voltage of $V_{px}$ via the column electrodes when the corresponding rows are "on" and the TFT transistors are conducting. In FIG. 13, only two steps 1310 are shown with a single reset step 1320 but typically more steps are needed to make the transition from one SLVD state to the other. For the reverse transition 1150 the same principle can be used.

As during the transitions, there is a time period wherein there are possible (absolute) values of the column electrode voltage $V_{col}$, which are larger than the (absolute) value of the common electrode voltage $V_{ce}$, there is a LVD-to-black and LVD-to-white pixel driving state during the transitions.

During the shutdown phase 1160 care has to be taken that $V_{EP}$ for all pixels is put to 0V one row-at-a-time. As during a super low voltage drive state no pixel can be addressed with $V_{EP}$=0V, the shutdown phase has to be executed by changing (decreasing) $V_{CE}$ to its final value (0V) in at least two steps, where during the last step the $V_{EP}$=0V state can be addressed. In between the steps $V_{px}$ has to be reset to avoid damaging voltages and/or artifacts. Also, during the shutdown phase, there is a time period wherein there are possible (absolute) values of the column electrode voltage $V_{col}$, which are larger than the (absolute) value of the common electrode voltage $V_{ce}$, and consequently a LVD-to-black or LVD-to-white pixel driving state.

Now with reference to FIGS. 14-16, an example of the use of SLVD will be discussed. In this example where specific, relevant voltages are used, it is shown that the SLVD state has to be preceded and followed by an LVD state. But even in that case, care has to be taken to apply the correct voltage to the pixels the last frame of the preceding states. Such a correct pixel voltage will result in a pixel voltage that is low enough to prevent artifacts and/or damage to the backplane circuitry after the change of the common voltage and the proportional change of the voltage on the storage capacitor upon entering and leaving the SLVD state.

Figure 14:
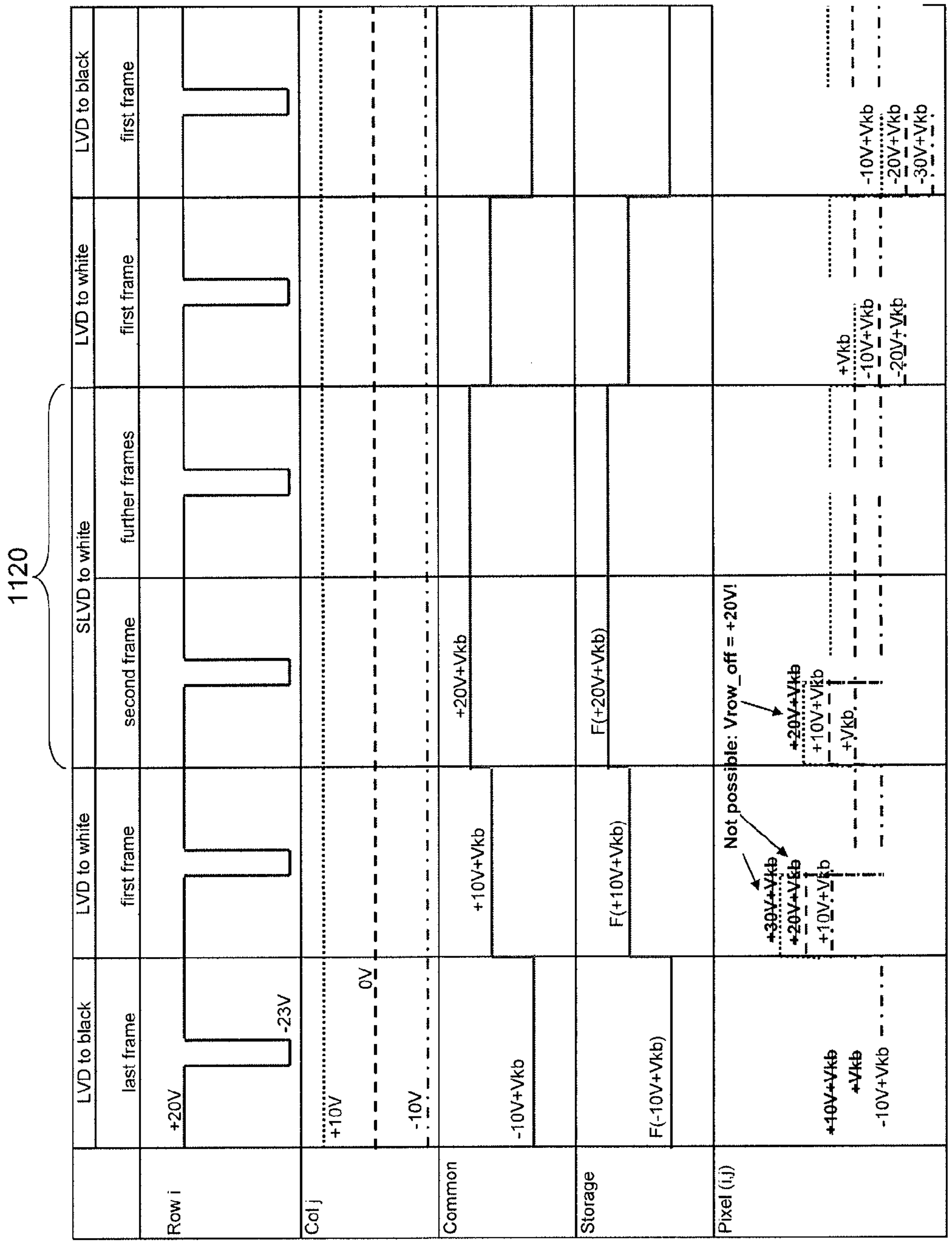
FIG. 14 shows the graph of relevant voltages with a first sequence of SLVD driving schemes.
Figure 15:
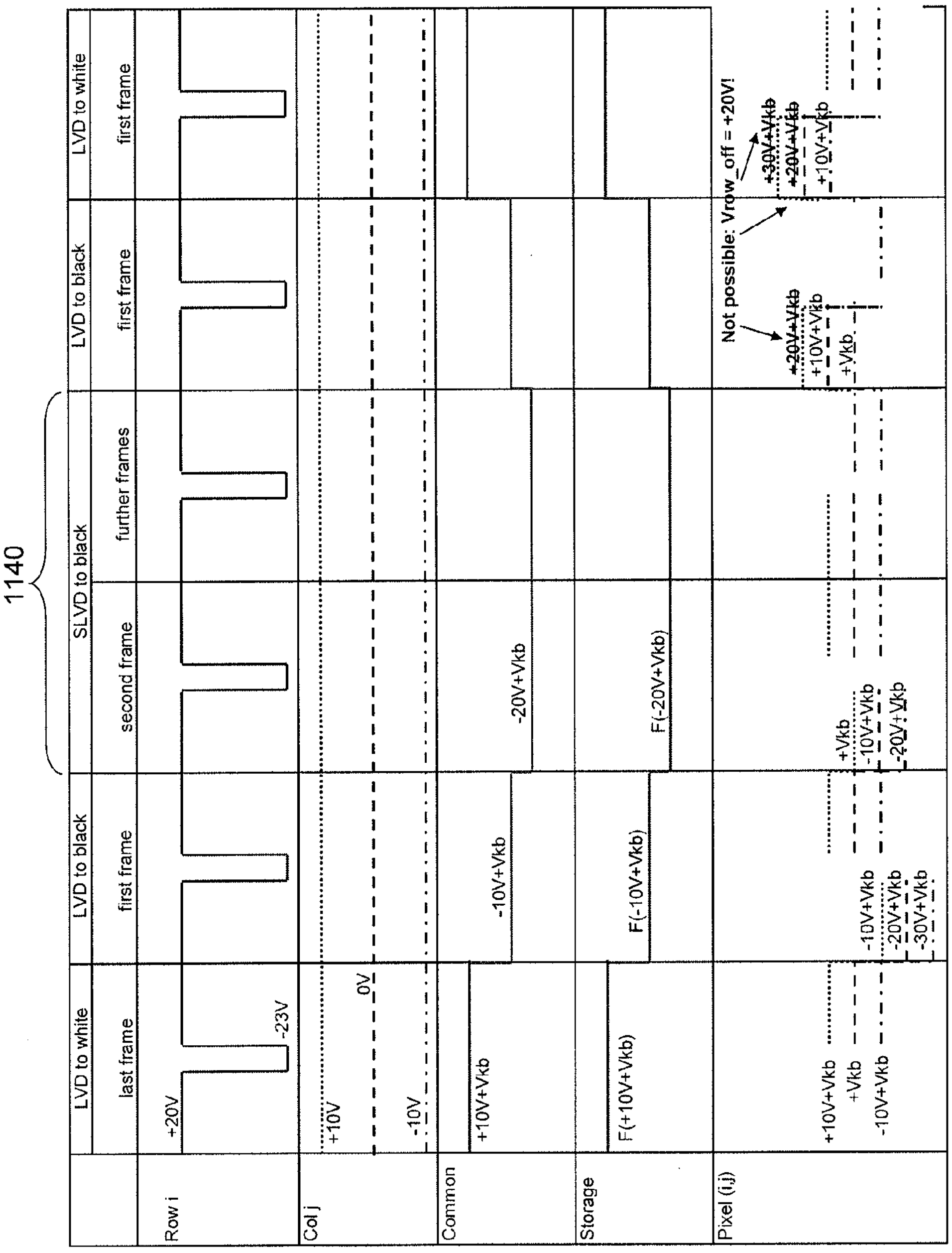
FIG. 15 shows the graph of relevant voltages with a second sequence of SLVD driving schemes.
Figure 16:
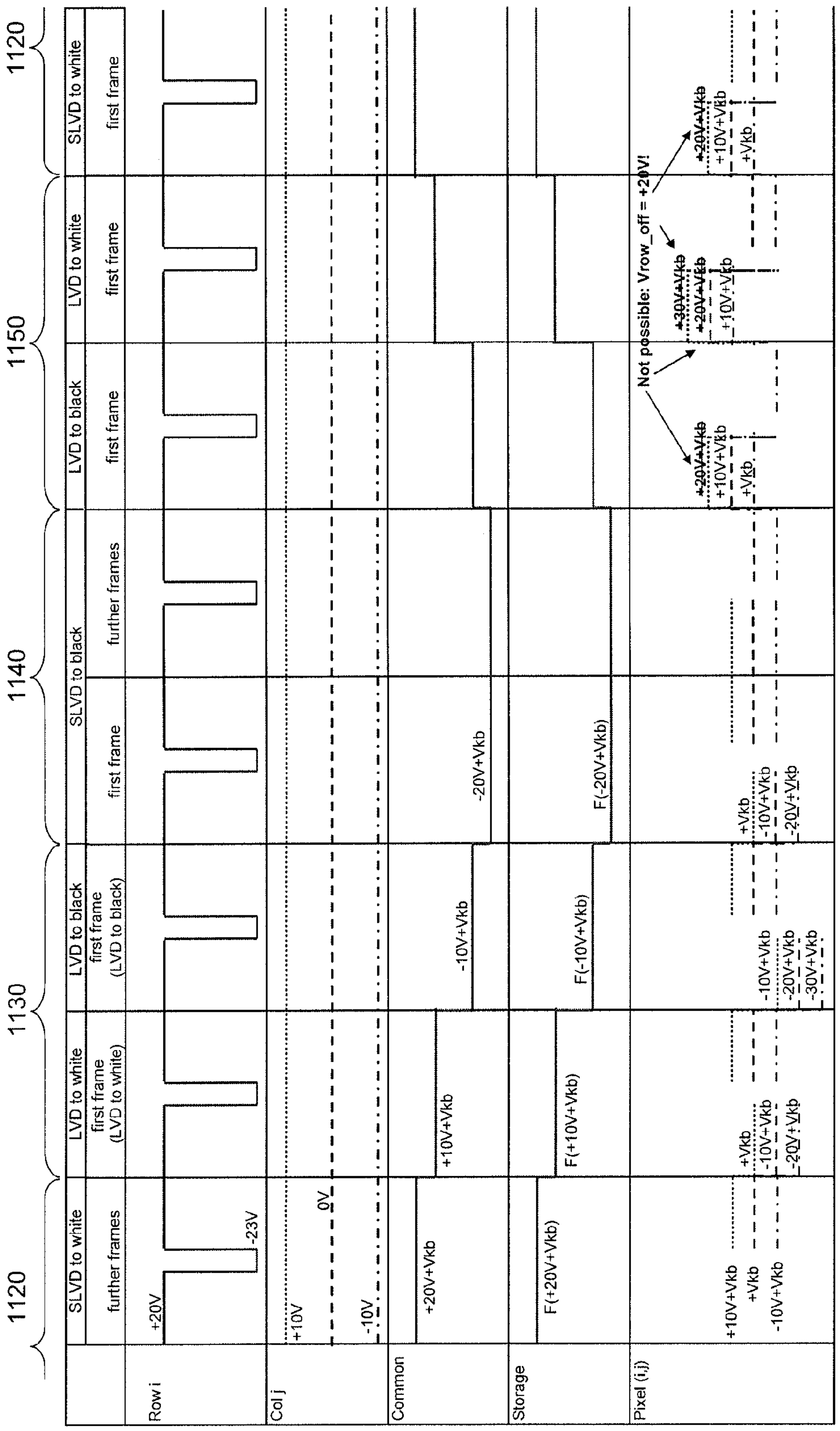
FIG. 16 shows FIGS. 14 and 15 appended.

In the specific example to be discussed now with reference to FIGS. 14-16, the following values apply:

For the LVD-to-White state, $V_{ce}$ is +10V+$V_{kb}$, $V_{col}$ may be +10V, 0V or −10V, $V_{row\_on}$ is −23V and $V_{row\_off}$ is +20V. $V_{kb}$ is the kickback voltage, which as discussed herein above generally has a rather small value.

For the LVD-to-Black state, $V_{ce}$ is −10V+$V_{kb}$, $V_{col}$ may be +10V, 0V or −10V, $V_{row\_on}$ is −23V and $V_{row\_off}$ is +20V.

For the SLVD-to-White state, the values are as for the LVD-to-White state, with the exception of $V_{ce}$, which is +20V+$V_{kb}$. The SLVD-to-White state is preceded and followed by different state. This state may be an LVD-to-white state or a HVD state as discussed later.

For the SLVD-to-Black state, the values are as for the LVD-to-Black state, with the exception of $V_{ce}$, which is −20V+$V_{kb}$. The SLVD-to-Black state is preceded and followed by a different state. This state may be an LVD-to-black state or a HVD state as discussed later.

FIGS. 14-16 show sequence diagrams for the most relevant transitions where the use of p-type TFT pixel switches is assumed. FIG. 14 shows the sequence LVD-to-Black→LVD-to-White→SLVD-to-White→LVD-to-White→LVD-to-Black. FIG. 15 shows the sequence LVD-to-White→LVD-to-Black→SLVD-to-Black→LVD-to-Black→LVD-to-White. FIG. 16 shows the transitions of FIGS. 14 and 15 appended.

As shown in FIG. 14 in the last frame of the LVD-to-black state, the following pixel voltages $V_{px}$ are not allowable: +10V+$V_{kb}$, corresponding to fast-to-black and 0V+$V_{kb}$ corresponding to slow-to-black. Indeed, the 20 V voltage jump when going from LVD-to-Black to LVD-to-White, would result in pixel voltages that are higher than $V_{row\text{-}off}$. This would result in putting the TFT in its conductive state at a different time than the row select time, leading to unwanted voltage leakage. The subsequent frame is a LVD-to-white transition frame, wherein the pixel voltage value of +10V $V_{kb}$ corresponding to stable-to-white is not allowed. Therefore during this frame, the pixel voltage values of all pixels are set to either 0V+$V_{kb}$ corresponding to slow-to-white or to 10V+$V_{kb}$ corresponding to fast-to-white.

On the other hand, the column and pixel voltage can be switched to any negative voltage, as that will never open the p-type TFT-switch. The only risk with large negative voltages (and in general for any large voltage) on these electrodes is the possibility of breakthrough of the dielectric between the gate and these electrodes. Therefore, all negative values of the pixel voltage are allowed in this example.

It should be noted that FIG. 14 applies to p-type TFT switch having a conducting channel at negative gate (row) voltage and non conducting channel at a positive gate voltage. For n-type TFTs the situation is the reverse, i.e. at a too large negative voltage on the column or the pixel the switch will open.

As shown in FIG. 15, the SLVD-to-Black state 1140 is followed by a transition frame, which is an LVD-to-Black frame. The pixel voltage during this transition frame, cannot be +10V+$V_{kb}$ corresponding to Fast to Black or 0V+$V_{kb}$ corresponding to Slow to Black but must be −10V+$V_{kb}$ corresponding to Stable to Black. In the last frame of the SLVD-to-Black state, the pixel voltage +10V+$V_{kb}$ corresponding to Very Fast to Black is not allowed.

FIG. 16 shows FIG. 14 and FIG. 15 appended. According to an alternative embodiment, it is possible to combine the LVD-to-White following SLVD-to-White state 1120 and the LVD-to-black frame preceding the SLVD to black state into a single frame (not shown in FIG. 16). In this frame the common voltage $V_{ce}$ is set to +$V_{kb}$. So, in fact this frame is a High Voltage Driving (HVD) scheme. Similarly, the LVD to black frame following SLVD-to-Black state 1140 and the LVD to white frame preceding the SLVD to white state 1120 can be replaced by such a single HVD frame. Of course, care should be taken that due to the voltage jumps during the transition, no pixel voltages are obtained that are potentially damaging to the matrix circuitry or cause image artifacts due to pixel voltages that put the pixel switches into their conducting state at an undesired moment.

Special care has to be taken for pixels that are already completely black when starting a 'to black' state or completely white when starting a 'to white' state. The reason is that in SLVD all pixels will be switching, as it is not possible to apply a $V_{EP}$ of 0V over the pixels anymore. Driving a pixel in the extreme switching state further in the same direction is called overdriving and can cause image artifacts due to 'image sticking like problems', later on.

Figure 17:
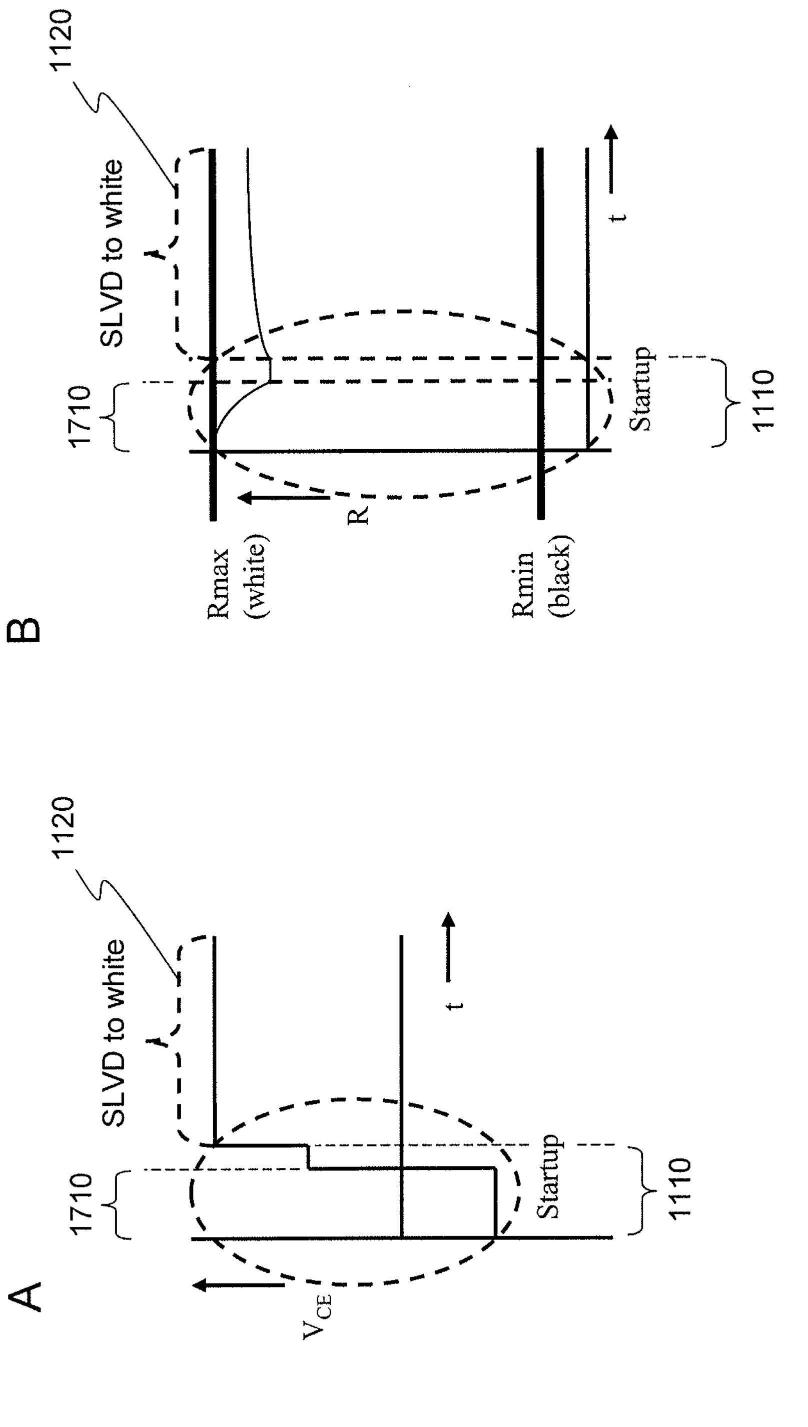
FIG. 17 shows the common voltage and the pixel voltage according to a further exemplary embodiment of the start-up phase.

As there are typically at least 3 column voltages available, it is possible to choose the speed at which the pixel is driven by addressing a certain voltage $V_{EP}$ standing over a pixel. A pixel in the extreme switching state can therefore be addressed in such a way that it will be driven as slowly as possible in that same direction during a state. Additionally, to avoid overdriving as shown in FIG. 17 a few frames of LVD or HVD can be added in a sub-phase 1710 of the startup phase 1110, where the pixels can either be kept at $V_{EP}$=0V or, for the pixels that are already completely switched in the direction of the next super low voltage drive state, be driven to the opposite direction to avoid overdriving during the subsequent SLVD state. The right hand side of FIG. 17 shows the reflection as a function of time. It shows that for pixels that are completely white just before starting an image update where the first state would be a SLVD to white image artifacts due to overdriving to white can be avoided by adding a few frames LVD to black or HVD that reduce the reflection from the extreme white condition to a grey state. During the subsequent SLVD to white the pixel will always be driven to white again, but this does not lead to overdriving due to the initial grey scale that was realized during the LVD to black or HVD. The same holds when the first state would be a SLVD to black for pixels that are in the extreme black state.

At the end of the last SLVD state a similar but reversed problem occurs. The pixels that have to be in one extreme switching state at the end of the update will be driven from their extreme position by a last super low voltage state of the opposite switching direction. For example, pixels that need to be completely white will not keep their switching state when the last state is a SLVD-to-black state, because in super low voltage drive all pixels will switch in the same direction during a state.

Figure 18:
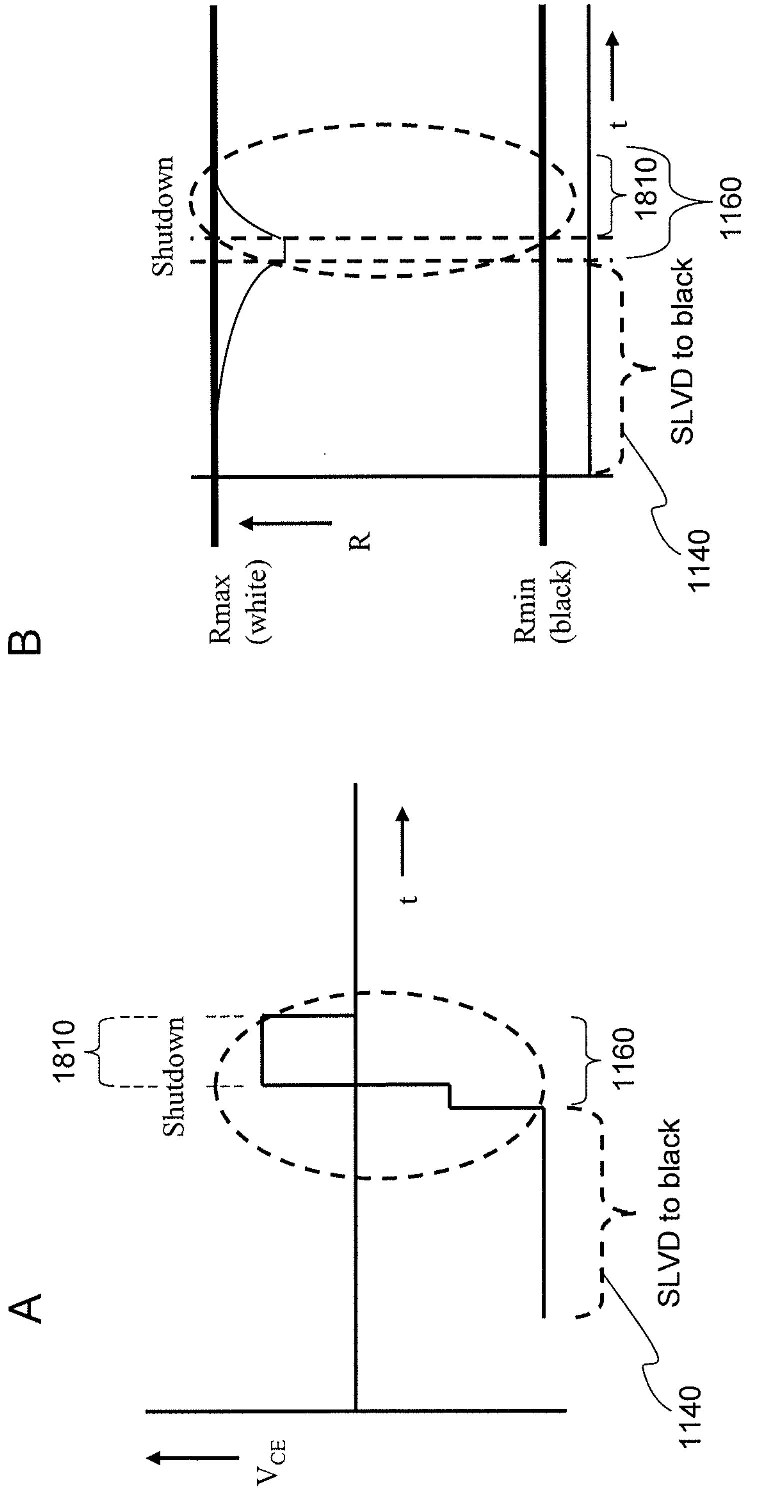
FIG. 18 shows the common voltage and the pixel voltage according to a further exemplary embodiment of the shut-down phase.

This can be avoided, as shown in FIG. 18, by ending the shutdown phase 1160 with a sub-phase 1810 of a number of frames of LVD in the opposite direction or HVD to restore the extreme switching states of the pixels that were driven in the wrong direction during the last state, while preserving the switching state of the pixels in the other extreme switching position. In the example shown, a short LVD to white or HVD is needed when the last state was a SLVD to black, as during that state all pixels are switched to black (fast or slow) making it impossible to have any pixel in the extreme white state after the image update. The same holds for a last SLVD to white state.

Of course, it is to be appreciated that any one of the above embodiments or processes may be combined with one or with one or more other embodiments or processes to provide even further improvements in finding and matching users with particular personalities, and providing relevant recommendations.

It is understood that this invention is especially suited for applications with electrophoretic displays, e.g., E Ink or SiPix, however in general the invention can be applied for any display type that is bistable and not too fast.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A display device comprising: a plurality of switches, each of the switches comprising an operational terminal and controlling a voltage on said operational terminal; a plurality of pixels, each having a pixel state that is driven by a driving voltage differential between a pixel voltage applied to a pixel terminal of the pixel and a common voltage applied to a common terminal of the pixel, said pixel terminal being coupled to a corresponding operational terminal of the switch, wherein both the pixel voltage and the common voltage are DC; a common driver for providing a variable common voltage to the common terminals; and a controller controlling the switches for driving the plurality of pixels, the controller being arranged to control the common driver in a first pixel driving state, wherein pixels are driven to a first color, to provide a common voltage to the common terminals with a first polarity and to control the common driver in a second pixel driving state, wherein pixels are driven to a second color, to provide a common voltage to the common terminals with a second polarity opposite to the first polarity, wherein a swing on the common voltage, which is an absolute value of the difference between the common voltage in the first pixel driving state and the common voltage in the second pixel driving state, is larger than an absolute value of the difference between a maximum and minimum voltage of a pixel voltage, wherein the plurality of switches are semiconductor switching devices, each comprising a first operational terminal, a switching control terminal, and a second operational terminal, the display device further comprising: a column driver connected to the first operational terminals for providing column voltages; and a row driver connected to the switching control terminals for providing a row select voltage switching the semiconductor switching devices of a row to a conductive state and a row non-select voltage switching the semiconductor switching devices of a row to a non-conductive state; wherein the pixel terminal of each of the pixels is coupled to the second operational terminal of the corresponding semiconductor switching device and the pixel voltage being applied to the pixel terminal by providing a column voltage to the first operational terminal of a corresponding semiconductor switching device being in the conductive state; the controller is arranged for controlling the operation of the column driver, the row driver, and the common driver for driving the plurality of pixels, such that the swing on the common voltage is larger than a swing on the column voltage, which is an absolute value of the difference between a maximum column voltage and a minimum column voltage, which is provided by the column driver, wherein a swing on the row voltage, which is an absolute value of the difference between the row select voltage and the row non-select voltage, is larger than a swing on the column voltage, which is an absolute value of the difference between a maximum column voltage and a minimum column voltage, which is provided by the column driver during the first and the second driving state, in such a way that the semiconducting switching devices is switched in their conducting state and in their non-conducting state irrespective of column and pixel voltage levels.

2. The display device according to claim 1, additionally comprising a storage driver for providing a storage voltage to a storage capacitor, connected between the storage driver and the pixel terminal of the pixel, having a storage voltage swing being proportional to a common voltage swing, wherein the storage driver is controlled by the controller to change the value of the storage voltage with proportional amplitude to and at substantially the same time as the common voltage.

3. The display device according to claim 2, wherein the common driver and the storage driver are controlled by the controller during a start up phase for an image update before the first or second pixel driving state in a first step to change a value of the common voltage and the storage voltage so that due to the change a value of the pixel voltage is changed to a value that keeps the semiconducting switching device in its non-conducting state, wherein the column driver is controlled by the controller in at least one reset step to reset the value of the pixel voltage and wherein the common driver and the storage driver are controlled by the controller in a second step to change the value of the common voltage and the storage voltage to the value corresponding to the first or second driving state, which ever is applicable.

4. The display device according to claim 3, wherein the common driver and storage driver are controlled by the controller during the start up phase in a third step to provide a common voltage and storage voltage enabling the provision of a zero voltage over the pixels or a common voltage with a polarity opposite to the polarity of the common voltage during the remainder of the start-up phase.

5. The display device according to claim 2, wherein the common driver and storage driver are controlled by the controller during a transition phase from the first to the second pixel driving state or vice versa to change the value of the common voltage and the storage voltage in a number of steps from the value corresponding to the first pixel driving state to the second pixel driving state or vice versa, each of the stepwise value changes of the common voltage and storage voltage resulting in a value change of the pixel voltage, wherein the column driver is controlled by the controller in at least a reset step between the steps to change the column voltage in such a way that the value of the pixel voltage is changed in a direction opposite to the direction of the value change of the pixel voltage caused by the value change of the common voltage and the storage voltage.

6. The display device according to claim 2, wherein the common driver and storage driver are controlled by the controller during a shutdown phase at the end of an image update after the first or second pixel driving state to change the value of the common voltage and the storage voltage in a number of steps to their final values, each of the stepwise value changes of the common voltage and storage voltage resulting in a value change of the pixel voltage, wherein the column driver is controlled by the controller in at least a reset step between the steps to change the column voltage in such a way that the value of the pixel voltage is changed in a direction opposite to the direction of the value change of the pixel voltage caused by the value change of the common voltage and the storage voltage.

7. The display device according to claim 6, wherein the common driver and the storage driver are controlled by the controller during the shutdown phase, in a further step to provide a common voltage and storage voltage enabling the provision of a zero voltage over the pixels or to provide a common voltage with a polarity opposite to the polarity of the common voltage during the remainder of the shutdown phase.

8. The display device according to claim 1 wherein the semiconductor switching device is a TFT.

9. A method for driving a display device comprising: a plurality of switches, each of the switches comprising an operational terminal and controlling the voltage on said operational terminal; a plurality of pixels, each having a pixel state that is driven by a driving voltage differential between a pixel voltage applied to a pixel terminal of the pixel and a common voltage applied to a common terminal of the pixel, the pixel terminal being coupled to a corresponding operational terminal of the switch, wherein both the pixel voltage and the common voltage are DC; and a common driver for providing a variable common voltage to the common terminals; the method comprising: controlling the switches for driving the plurality of pixels and controlling the common driver in a first pixel driving state, wherein pixels are driven to a first color, to provide a common voltage to the common terminals with a first polarity and in a second pixel driving state, wherein pixels are driven to a second color, to provide a common voltage to the common terminals with a second polarity opposite to the first polarity, wherein a swing on the common voltage, which is an absolute value of the difference between the common voltage in the first pixel driving state and the common voltage in the second driving state, is larger than an absolute value of the difference between a maximum and minimum voltage of a pixel voltage, wherein the plurality of switches are semiconductor switching devices, each comprising a first operational terminal, a switching control terminal, and a second operational terminal, the display device further comprising: a column driver connected to the first operational terminals for providing column voltages; and a row driver connected to the switching control terminals for providing a row select voltage switching the semiconductor switching devices of a row to a conductive state and a row non-select voltage switching the semiconductor switching devices of a row to a non-conductive state; wherein the pixel terminal of each of the pixels is coupled to the second operational terminal of the corresponding semiconductor switching device and the pixel voltage being applied to the pixel terminal by providing a column voltage to the first operational terminal of a corresponding semiconductor switching device being in the conductive state; the method comprising the step of controlling the operation of the column driver, the row driver, and the common driver for driving the plurality of pixels, such that the swing on the common voltage, is larger than a swing on the column voltage, which is an absolute value of the difference between a maximum column voltage and a minimum column voltage, which is be provided by the column driver, wherein a swing on the row voltage, which is an absolute value of the difference between the row select voltage and the row non-select voltage, is larger than a swing on the column voltage, which is an absolute value of the difference between a maximum column voltage and a minimum column voltage, which is provided by the column driver during the first and the second driving state, in such a way that the semiconducting switching devices is switched in their conducting state and in their non-conducting state irrespective of column and pixel voltage levels.

10. The method according to claim 9, comprising the further step of controlling a storage driver of the display device for providing a storage voltage to a storage capacitor, connected between the storage driver and the pixel terminal of the pixel and having a storage voltage swing being proportional to a common voltage swing, to change the pixel voltage with proportional amplitude to and at substantially the same time as the common voltage, with proportional amplitude to and at substantially the same time as the common voltage.

11. The method according to claim 10, further comprising controlling the common driver and storage driver during a start up phase for an image update before the first or second pixel driving state in a first step to change the common voltage and the storage value to such a value that a value of the pixel voltage is changed to a value that keeps the semiconducting switching device in its non-conducting state, controlling the column driver in at least one reset step to reset the value of the pixel voltage and controlling the common driver and storage driver in a second step to change the value of the common voltage and the storage voltage to the value corresponding to the first or second driving state, which ever is applicable.

12. The method according to claim 11, wherein the common driver and storage driver are controlled during the start up phase in a third step, which is executed before the first step, to provide a common voltage and a storage voltage, enabling the provision of a zero voltage over the pixels or to provide a common voltage with a polarity opposite to the polarity of the common voltage during the remainder of the start-up phase.

13. The method according to claim 10, further comprising controlling the common driver and the storage driver during a transition phase from the first to the second pixel driving state or vice versa to change the value of the common voltage and storage voltage in a number of steps from the value corresponding to the first pixel driving state to the second pixel driving state or vice versa, each of the stepwise value changes of the common voltage and storage voltage resulting in a value change of the pixel voltage, and controlling the column driver in at least a reset step between the steps to change the column voltage in such a way that the value of the pixel voltage is changed in a direction opposite to the direction of the value change of the pixel voltage caused by the value change of the common voltage and storage voltage.

14. The method according to claim 10, further comprising controlling the common driver and storage driver during a shutdown phase at the end of an image update after the first or second pixel driving state to change the absolute value of the common voltage and storage voltage in a number of steps to their final values, each of the stepwise value changes of the common voltage and storage voltage resulting in a value change of the pixel voltage, and controlling the column driver in at least a reset step between the steps to change the column voltage in such a way that the value of the pixel voltage is changed in a direction opposite to the direction of the value change of the pixel voltage caused by the value change of the common voltage and storage voltage.

15. The method according to claim 14, wherein the common driver and storage driver are controlled, during the shutdown phase, in a further step to provide a common voltage and a storage voltage, enabling the provision of a zero voltage over the pixels or to provide a common voltage with a polarity opposite to the polarity of the common voltage during the remainder of the shutdown phase.

* * * * *